(12) United States Patent
Schaller

(10) Patent No.: US 7,042,909 B2
(45) Date of Patent: May 9, 2006

(54) METHOD AND APPARATUS FOR CONTROLLING THE TIMING OF A COMMUNICATION DEVICE

(75) Inventor: Lane B. Schaller, Western Springs, IL (US)

(73) Assignee: Freescale Semiconductor, Inc., Austin, TX (US)

( * ) Notice: Subject to any disclaimer, the term of this patent is extended or adjusted under 35 U.S.C. 154(b) by 907 days.

(21) Appl. No.: 09/892,987

(22) Filed: Jun. 27, 2001

(65) Prior Publication Data

US 2003/0002537 A1    Jan. 2, 2003

(51) Int. Cl.
*H04J 3/06* (2006.01)
(52) U.S. Cl. .................................... 370/503; 370/350
(58) Field of Classification Search ................ 370/503, 370/347, 350
See application file for complete search history.

(56) References Cited

U.S. PATENT DOCUMENTS

| | | | | |
|---|---|---|---|---|
| 4,031,517 A | * | 6/1977 | Hirtle | 703/24 |
| 4,956,842 A | * | 9/1990 | Said | 714/815 |
| 5,185,880 A | | 2/1993 | Ueda et al. | |
| 5,497,373 A | * | 3/1996 | Hulen et al. | 370/259 |
| 5,663,954 A | | 9/1997 | Hakkanen et al. | |
| 5,809,091 A | | 9/1998 | Barrow | |
| 5,842,005 A | * | 11/1998 | Walsh et al. | 713/500 |
| 5,923,650 A | * | 7/1999 | Chen et al. | 370/331 |
| 5,936,966 A | * | 8/1999 | Ogawa et al. | 370/469 |
| 6,101,173 A | * | 8/2000 | Bayley | 370/311 |
| 6,125,404 A | * | 9/2000 | Vaglica et al. | 713/375 |
| 6,154,642 A | | 11/2000 | Dumont et al. | |
| 6,208,871 B1 | | 3/2001 | Hall et al. | |
| 6,212,398 B1 | | 4/2001 | Roberts et al. | |
| 6,223,040 B1 | | 4/2001 | Dam | |
| 6,502,152 B1 | * | 12/2002 | Laurenti | 710/264 |
| 6,560,215 B1 | * | 5/2003 | Bloem et al. | 370/347 |
| 6,584,542 B1 | * | 6/2003 | Weigand | 711/104 |
| 6,658,465 B1 | * | 12/2003 | Touboul | 709/223 |
| 6,721,859 B1 | * | 4/2004 | Smyers | 711/154 |
| 6,917,608 B1 | * | 7/2005 | Weigand | 370/347 |

\* cited by examiner

*Primary Examiner*—Ajit Patel
*Assistant Examiner*—Chirag Shah
(74) *Attorney, Agent, or Firm*—Foley & Lardner LLP

(57) ABSTRACT

A system timer for controlling the timing at which a communication device communications. The system timer can include a memory device and a processor. The memory device can be adapted to store a set of software instructions which can be executed by the processor in any of a plurality of sequences. Each sequence can cause the processor to generate a corresponding set of control signals adapted to enable the communication device to communicate in one of a multiplicity of communication formats. Each communication format can device the timing at which a set of data is communicated by the communication. The plurality of sequences in which the processor executes the software instructions can be controlled by a second processor in the communication device.

25 Claims, 22 Drawing Sheets

| TYPES OF DSP INTERRUPTS |
|---|
| INVALID |
| FRAME |
| RXWIN |
| TXWIN |
| HANDOFF |
| APC |
| TXWINOFF |
| RESERVED |

| INSTRUCTION | FORMAT |
|---|---|
| JCMD | JCMD aaaa aaaa |
| JMP | JMP ABCD aaaa aaaa |
| SET | SET m, k, j |
| CLR | CLR m, k, j |
| DSPINT | DSPINT tttt |
| ARMINT | ARMINT tttt |
| SYNSEND | SYNSEND |
| RXENA | RXENA |
| RXDIS | RXDIS |
| TXSTART | TXSTART |
| RTBWAIT | RTBWAIT w |
| FRWAIT | FRWAIT w |
| TBWAIT | TBWAIT w |
| TBADJSN | TBADJSN |
| NOP | NOP |

FIG. 9

| SEQUENCER RAM ADDRESS | INSTRUCTION | |
|---|---|---|
| 0 | JMP 1000, 6 | 246 |
| 1 | TBWAIT 1000 | 248 |
| 2 | ARMINT 3 | 250 |
| 3 | SET 1, 1, 1 | 252 |
| 4 | TBWAIT 2000 | 254 |
| 5 | CLR 1, 1, 1 | 256 |
| 6 | JMP 0100, 11 | 258 |
| 7 | TBWAIT 3000 | 260 |
| 8 | SET 2, 2, 2 | 262 |
| 9 | TBWAIT 2000 | 264 |
| 10 | CLR 2, 2, 2 | 266 |
| 11 | JMP 0010, 16 | 268 |
| 12 | TBWAIT 6000 | 270 |
| 13 | SET 2, 2, 2 | 272 |
| 14 | TBWAIT 6500 | 274 |
| 15 | CLR 2, 2, 2 | 276 |
| 16 | JMP 0001, 21 | 278 |
| 17 | TBWAIT 7000 | 280 |
| 18 | SET 2, 2, 2 | 282 |
| 19 | TBWAIT 7500 | 284 |
| 20 | CLR 2, 2, 2 | 286 |
| 21 | JCMD 0 | 288 |

FIG. 21

| SEQUENCER RAM ADDRESS | INSTRUCTION |
|---|---|
| 0 | JCMD 1 |
| 1 | TBWAIT 1000 |
| 2 | ARMINT 3 |
| 3 | SET 1, 1, 1 |
| 4 | RTBWAIT 1000 |
| 5 | JCMD 6 |
| 6 | CLR 1, 1, 1 |
| 7 | JCMD 8 |
| 8 | TBADJSN 0 |
| 9 | RTBWAIT 2000 |
| 10 | SET 2, 2, 2 |
| 11 | RTBWAIT 1000 |
| 12 | JCMD 13 |
| 13 | CLR 2, 2, 2 |
| 14 | TBADJSN 1 |
| 15 | JCMD 0 |

FIG. 22

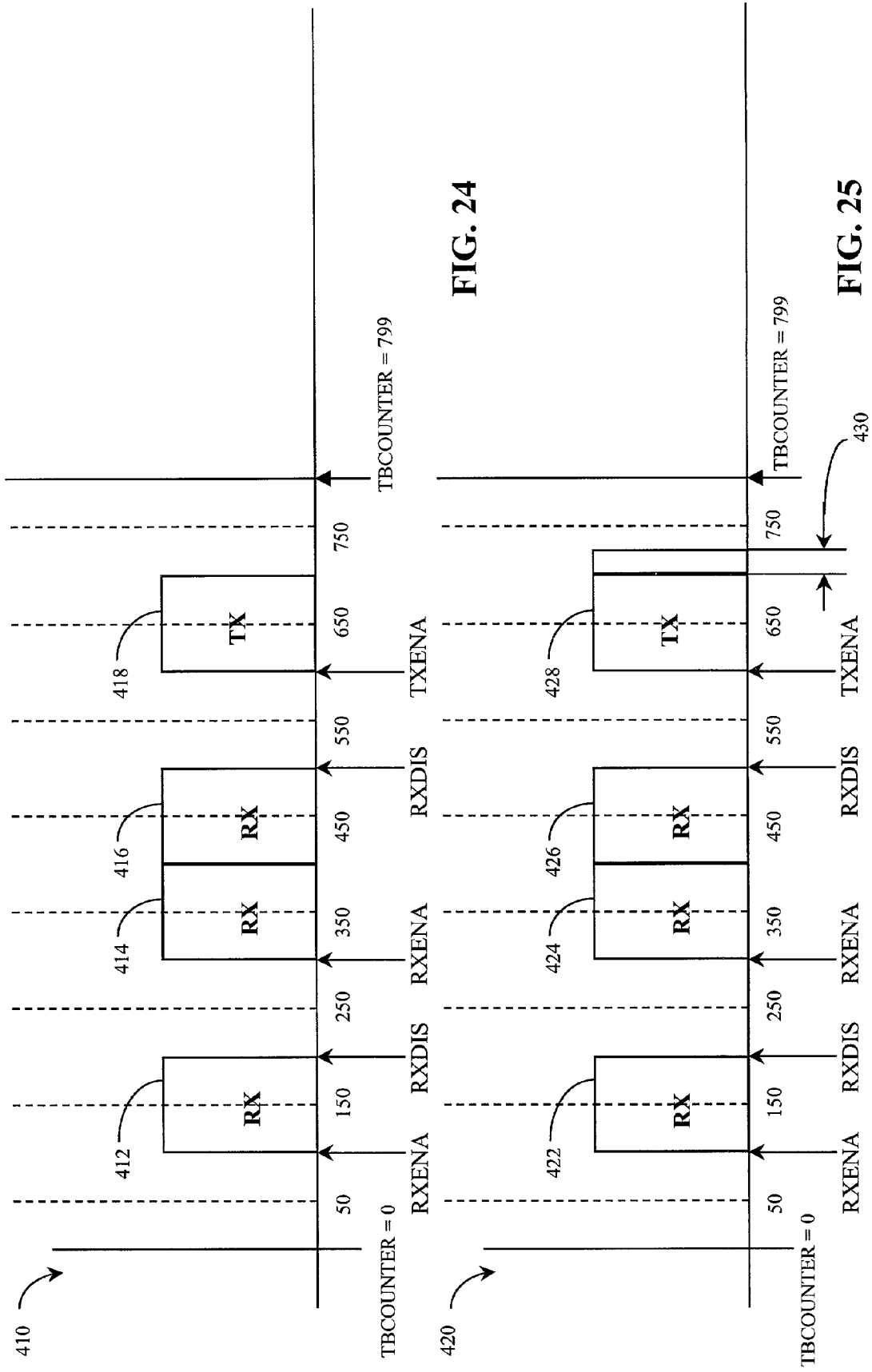

METHOD AND APPARATUS FOR CONTROLLING THE TIMING OF A COMMUNICATION DEVICE

The present invention generally relates to a communication system timer, and more particularly to a communication system timer and a method for controlling the timing of a communication device to enable dynamic multi-slot communication.

BACKGROUND OF THE INVENTION

Enabling communication between a mobile communication device and one or more base stations is largely dependent on the ability to coordinate the timing of the mobile device with the timing of the base station(s). Toward this end, base stations are conventionally configured to communicate at a standard frequency or set of frequencies that may be defined for example, in an industry standard such as the TIA-EIA-136 standard or the standard that governs communication within a GSM communication system. In addition, base stations are configured to communicate using signals that are formatted according to a communication protocol that is also defined via the communication standard in use. For example, communication is typically defined to be cyclical in that each communication signal comprises a series of data frames having a defined format. Specifically, each frame is typically defined to include a fixed number of data symbols and a fixed number of time slots during which predefined forms of communication may occur. The time slots may comprise one or more receive slots during which the mobile communication device may be designated to receive information transmitted by the base station and one or more transmit slots during which the mobile communication device may be designated to transmit information to the base station. Thus, after a first frame comprising, for example, a receive slot and a transmit slot, the cycle repeats, i.e., another frame having a receive slot and a transmit slot follow.

As a result, the duration of each frame is equal to the smallest amount of time before the communication cycle repeats. Due to the cyclical nature of the communication signal and because the positions within a frame at which the receive and transmit slots are located may be fixed relative to the start of the frame, once the mobile device determines where the start of a frame occurs within a communication signal, the mobile device may synchronize to the frame start time so that subsequently transmitted frames are properly received. More particularly, once the start of a frame is identified, a system timer disposed in the mobile device synchronizes to the frame start and then generates control signals to control the timing at which various components disposed within the mobile device operate. For example, the system timer may generate control signals that enable a transmitter during the transmit slot and that enable a receiver during the receive slot.

Conventionally, system timers are configured to perform timing control by executing a set of software instructions that have been preprogrammed into the timer during manufacture. Thus, the conventional system timer may be programmed to operate according to a single predefined communication protocol. However, communication protocols are becoming more robust and are able to support a greater number and increasingly diverse set of signal formats. For example, mobile communication protocols that were once formatted exclusively to support the transmission of voice data are now being adapted to support the transmission of digital data. Unfortunately, the programming associated with conventional system timers is fixed such that the mobile communication device is limited to communicating in the protocol or format for which the system timer was originally programmed. In addition, system timers are currently used in a variety of different wireless communication devices that may each be adapted to operate according to different communication protocols. However, due to the preprogrammed, inflexible configuration of conventional system timers, a different system timer must be manufactured for each specific application.

Moreover, due to the mobility of a mobile communication device a system timer that has successfully synchronized to the base station may become unsynchronized due to movement of the mobile communication device relative to the base station. Specifically, the distance between a mobile communication device and a base station may vary when, for example, the mobile communication device is disposed in an automobile that is traveling either nearer or farther away from the base station and may adversely affect the timing between the mobile communication device and the base station and may cause interference between the signals being transmitted by the mobile communication device and signals being transmitted by one or more other mobile communication devices. More particularly, the base station assigns each mobile communication device disposed in a service area, referred to as a cell, associated with the base station a slot of time occurring at a specific location in a frame during which the mobile communication device may transmit signals for reception at the base station. However, a mobile telephone disposed in an automobile traveling toward the base station may generate signals that arrive at the base station earlier than the time slot assigned to that mobile communication device. Specifically, because the distance between the mobile station and the base station is decreasing as the automobile moves toward the base station the signal arrives earlier because the signal travels a shorter distance to reach the base station. Unfortunately, a signal arriving too early will interfere with a communication signal transmitted by a mobile communication device that has been assigned the earlier time slot. In contrast, a mobile communication device disposed in an automobile traveling away from the base station may generate signals that arrive at the base station later than anticipated because the distance between the mobile station and the base station is increasing as the automobile moves away from the base station so that the signal must travel a longer distance before reaching the base station. Thus, the signals that arrive at the base station late will interfere with communication signals transmitted by a mobile communication device that has been assigned to the later time slot. To combat this phenomenon, the base station is adapted to measure a timing delay associated with each mobile communication device communicating with the base station that represents the amount of time that a signal emanating from each mobile station is arriving either early or late. The base station then requests that each mobile telephone adjust the times at which information is transmitted to the base station by an amount of time equal to the time delay. When received at the mobile telephone, a microprocessor disposed in the mobile communication device may cause the system timer to use the timing delay to adjust the timing of the mobile communication device.

Conventional system timers are typically configured to use the timing delay information transmitted by the base station as it is received from the base station. Thus, timing delay information transmitted to the mobile communication device is supplied to the system timer at any time during the frame and often at multiple times during the frame. As a result, the system timer may interrupt the operation of the microprocessor or the digital signal processor several times during each frame to receive the delay data required for the timer to remain synchronous with the base station. Unfortunately, repeated interruptions unnecessarily burden the microprocessor/digital signal processor and unnecessarily limit the ability of the mobile device to perform at higher data rates.

Thus, there is a need in the art for a method and apparatus for controlling the timing at which a mobile communication device communicates that is adapted to execute instructions in a non-fixed order so that the mobile communication device may communicate different amounts of data using differently formatted signals. In addition, there is a further need in the art for a method and apparatus for controlling the timing at which a mobile communication device communicates that is able to compensate for movement of the mobile communication device relative to the base station in an efficient manner.

BRIEF DESCRIPTION OF THE DRAWINGS

FIG. 9 is a table having a set of software instructions for programming the system timer of FIG. 4;

FIG. 21 is a table of software instructions that may be used to program the system timer to generate the waveforms of FIG. 19;

FIG. 22 is a table of software instructions that may be used to program the system timer to generate the waveforms of FIG. 19;

FIG. 24 is a waveform that may be generated by the system timer using the generic program blocks of FIGS. 23A and 23B;

FIG. 25 is a waveform that may be generated by the system timer using the generic program blocks of FIGS. 23A and 23B; and, FIG. 26 is a block diagram of a system timer configured to control two serial devices.

SUMMARY OF THE INVENTION

According to one aspect of the invention, a system timer controls the timing at which a mobile device communicates and includes a processor for executing a set of software instructions and a memory device coupled to the processor for storing the software instructions. In response to executing the set of software instructions, the processor causes a set of control signals that are adapted to control the timing of the communication device to be generated. The order in which the processor executes the instructions is not fixed but may instead be altered by a microprocessor and/or a digital signal processor disposed in the mobile device.

The mobile device further includes a timebase counter and frame counter that operate at a predefined communication frequency. A timebase length register, timebase adjust register and timing adjust register may be used to alter the values stored in the timebase counter to thereby compensate for movement of the mobile device relative to the base station.

DETAILED DESCRIPTION

Figure 1:
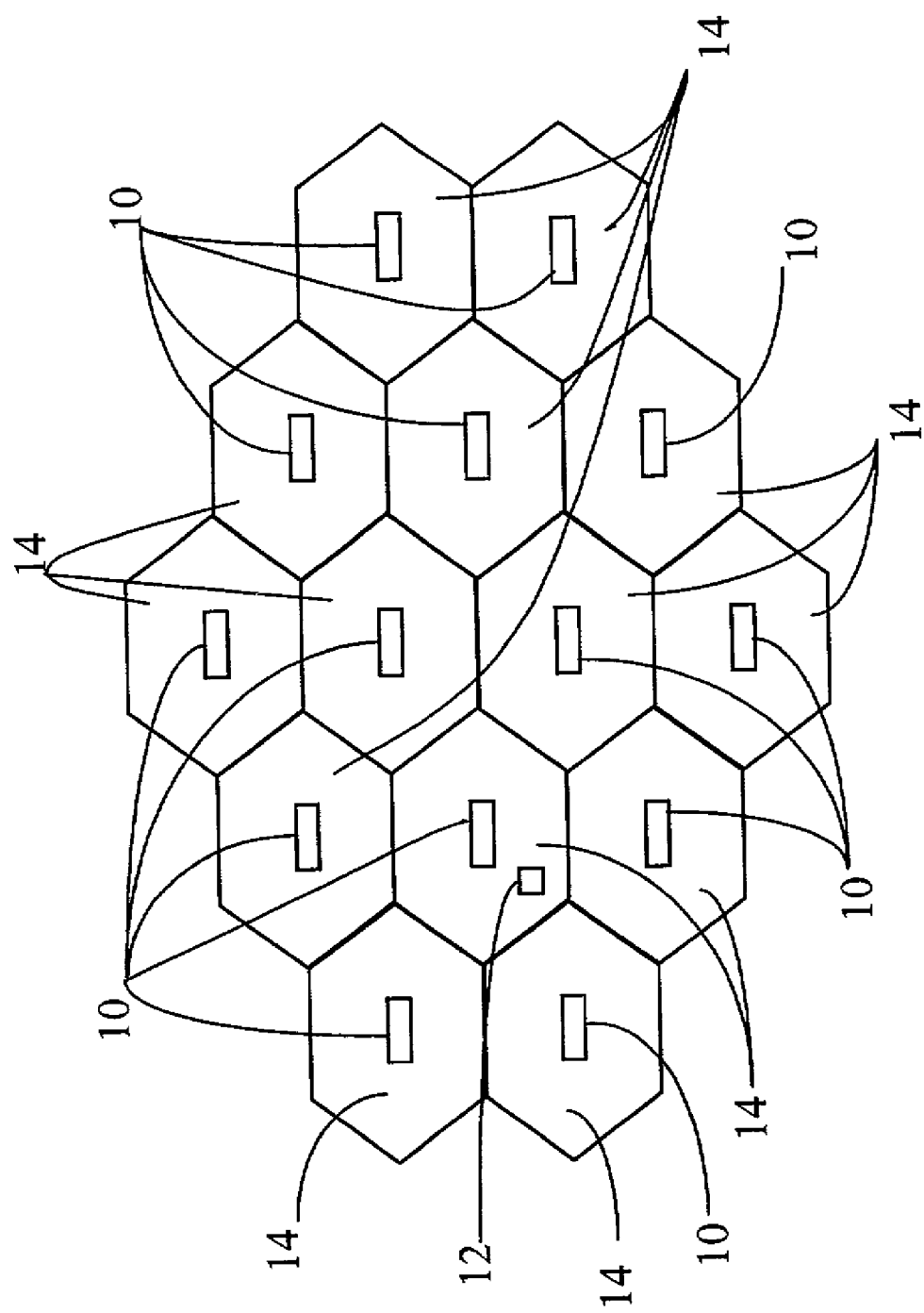
FIG. 1 is a block diagram of a communication network having a set of base stations for providing service to a mobile communication device located within a cell region.

Referring now to the drawings, wherein like reference numerals refer to similar or identical parts throughout the several views, and more specifically to FIG. 1 thereof, there is shown a block diagram representation of a network of mobile communication system base stations 10 that provide wireless communication service to a wireless communication device 12 ("communication device") on a subscription basis. Specifically, each base station 10 is adapted to provide service to the communication device 12 that is located within a respective, geographically defined service area, referred to as a cell 14, having a six-sided geometric shape. Further, the base stations 10 are geographically positioned so that the cell 14 associated with each base station 10 abuts against the cells 14 associated with six other base stations 10 to thereby form a honeycomb-like pattern (see FIG. 2) of cells 14 in which continuous communication service is available to the communication device 12 disposed therein. As will be understood by one having ordinary skill in the art, the shape of the cell is not limited to a six-sided figure and may instead have any desired configuration. Further, the cell octagonal shape is typically generated by causing a set of six cells having circularly shaped coverage areas to overlap in manner such that each cell has a coverage area shaped like an octagon.

Figure 2:
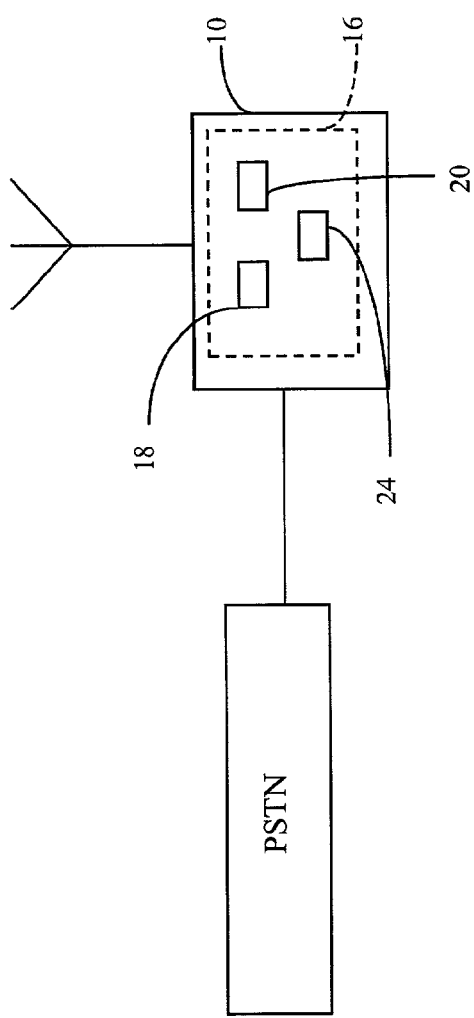
FIG. 2 is a block diagram of a base station of FIG. 1 coupled to a public switched telephone network.

Referring now to FIG. 2, each base station 10 has a set of wireless communication equipment 16, including, for example, a transmitting device 18 and a receiving device 20, to enable communication with the communication devices 12 and to further enable communication between the communication devices 12 and a public switched telephone network ("PSTN") 22. A base station system clock 24, also disposed at the base station 10, operates at a multiple of the rate at which the base station 10 generates data symbols. For example, the system clock 24 may operate at a frequency of 13 MHz for a GSM system or at a frequency of 9.72 MHz for a system governed by TIA-IA-136. As will be understood by one having ordinary skill in the art, a data symbol is a term of art that generally refers to a predefined quantity of data.

Figure 3:
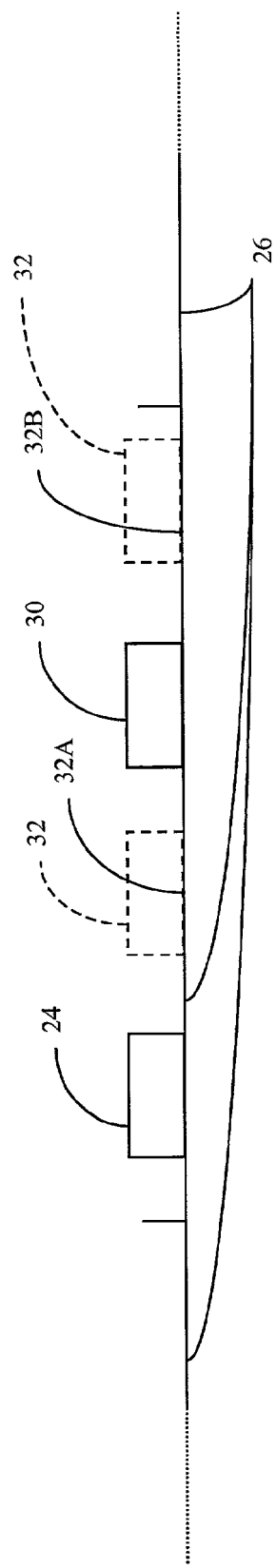
FIG. 3 is a diagram of a format for a frame of data symbols associated with a communication signal.

Referring also to FIG. 3, wireless communication signals 26 are conventionally formatted to include a stream of data symbols that are further formatted into frames 26, each of which includes a defined quantity of symbols. In addition, portions of each frame 26, referred to as time slots, are reserved for specific forms of communication. For example, depending upon the standard in use, each frame 26 will typically include a receive slot 28 during which a receiver (not shown) disposed in the communication device 12 is enabled so that communication signals may be received from the base station 10. In addition, each frame 26 will typically include a transmit slot 30 during which a transmitter (not shown) disposed in the communication device 12 is enabled so that communication signals may be transmitted from the communication device 12 to the base station 10. Of course, a transmit slot 30 occurring at the communication device 12 is treated as a receive slot 28 at the base station 10 and a receive slot 28 is treated as a transmit slot 30 at the base station 10. Moreover, each frame may include a single receive slot and a single transmit slot that are both designated for communication with a single communication device 12, as depicted in FIG. 3, or may instead include multiple receive slots 28 and/or multiple transmit slots 30 that are designated for communication with a single communication device 12 to permit multi-slot communication. As will be understood by one having ordinary skill in the art, the positions at which the receive and transmit slots 28, 30 are disposed in the frame 26 may vary depending on the communication standard in use. Each frame 26 will typically further include a handoff time slot 32 reserved for the receipt of handoff information at the communication device 12 that may be positioned at any number of locations in the frame 26 depending upon the communication standard in use. For example, the handoff time slot 32 may be located at a first position 32A that is disposed before the transmit slot 30 and after the receive slot 28 or at a second position 32B that is disposed after the transmit slot 30. As will be understood by one having ordinary skill in the art, during the handoff time slot 32, the communication device 12 tunes to an off-channel frequency in an attempt to locate a control channel on which a neighboring base station 10 is transmitting control information. Upon locating such a control channel, the communication device 12 receives information transmitted on the control channel and uses the received information to determine whether the neighboring base station 10 is an acceptable candidate for handling a call handoff procedure for the communication device 12. As will further be understood by one having ordinary skill in the art, a call handoff procedure typically occurs when the communication device 12 is traveling from a first cell 14 that is serviced by a first base station 10 to a second, neighboring cell 14 that is serviced by a second, neighboring base station 10. Specifically, when traveling away from the first base station 10 and toward the neighboring base station 10, the signal strength and quality of an on-going telephone call being transmitted by the first base station 10 to the communication device 12 may begin to degrade due to reduced communication signal power strength. When signal degradation occurs, the first base station 10 transfers, or hands off, the telephone call to the neighboring base station 10. To prevent an interrupt in service during the call hand-off procedure, the communication device 12 uses the handoff time slot 32 to identify a neighboring base station 10 that is an acceptable candidate for receiving the telephone call during the hand-off procedure. A base station 10 generally qualifies as an acceptable candidate depending on whether the base station 10 is near enough to provide sufficient signal power to carry the call and further depending on the amount of communication traffic being carried by the candidate base station 10 at the time of call handoff.

Figure 4:
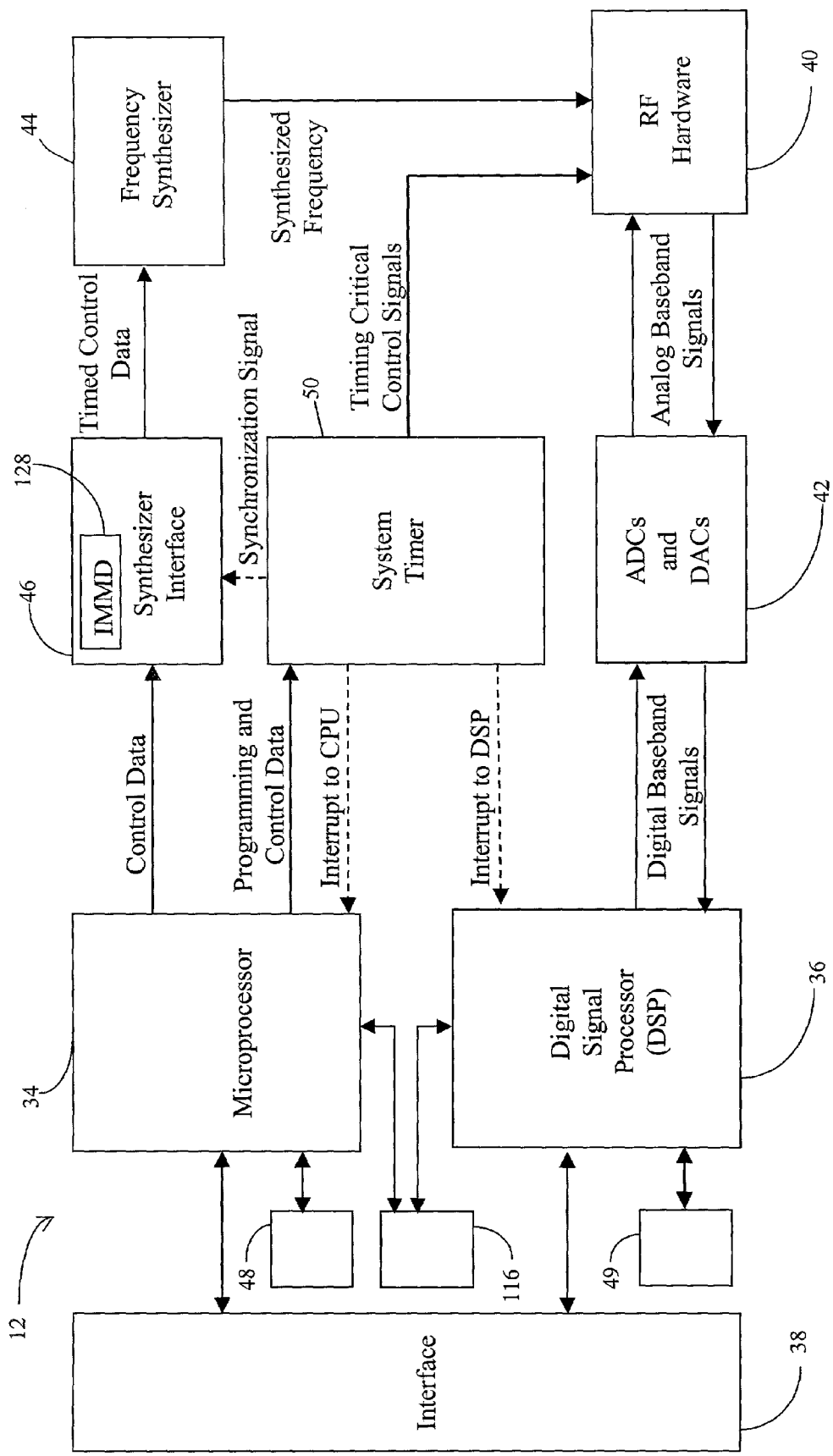
FIG. 4 is a block diagram of one of the mobile communication devices of FIG. 1.

Referring now to FIG. 4, the communication device 12 may include a microprocessor 34, that may implemented using, for example, a reduced instruction set microprocessor, and a digital signal processor (DSP) 36 both of which are coupled to and receive data from an interface managing unit 38. The interface managing unit 38 is further coupled to a set of interface devices (not shown) by which a user may interface with the microprocessor 34 and the DSP 36 including, for example, a keypad, a liquid crystal display, a microphone and a speaker. The DSP 36 is further coupled to and controls a set of RF hardware devices 40 that may include, for example, a transmitter and a receiver, in addition to other conventional communication signal processing hardware devices, via a set of analog to digital and digital to analog converters 42. The microprocessor 34 controls the tuning of the RF hardware devices 40 using a frequency synthesizer 44 that is coupled to the microprocessor 34 via a synthesizer interface 46. Specifically, frequency data is supplied by the microprocessor 34 to the synthesizer interface 46, which subsequently transfers the frequency data to the frequency synthesizer 44 for use in tuning the RF hardware devices 40 to one, or more of a set of frequency levels provided in the frequency data. The microprocessor 34 and DSP 36 are further programmed to execute a set of instructions disposed in a set of memory devices 48, 49, respectively, to allow the communication device 12 to perform any of a number of tasks including, for example, receiving/transmitting incoming and outgoing phone calls, and storing/retrieving frequently used telephone numbers.

A system timer 50 is coupled to and adapted to provide timing critical control signals to the microprocessor 34, the DSP 36, the RF hardware devices 40 and the synthesizer interface 46. Specifically, the system timer 50 is adapted to provide interrupt signals to the DSP 36 and/or the microprocessor 34 and is further adapted to provide control signals that cause the receiver and transmitter to be enabled/disabled at specific time slots during each frame 26. The system timer 50 is further coupled to and provides a synchronization signal to the synthesizer interface 46, as will be described in greater detail below, and includes a set of sixteen output pins 47 that may be used to control any desired set of devices (not shown).

Figure 5:
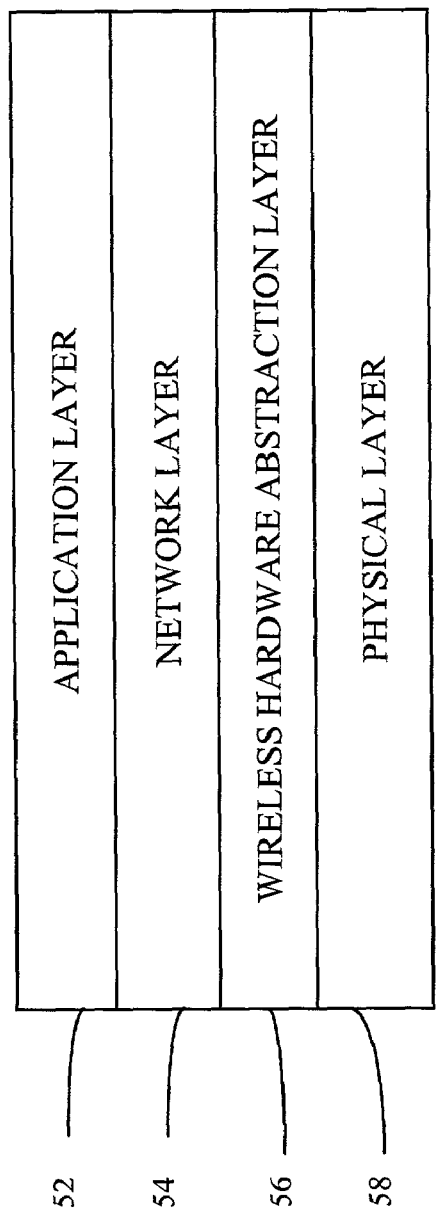
FIG. 5 illustrates a model of the architecture of the mobile communication device of FIG. 4.

Referring also to FIG. 5, as is conventional, the architecture of the communication device 12 may be modeled using a set of layers 52, 54, 56, 58 that are each responsible for performing a specific set of tasks. Although the number of layers in the architecture and the tasks performed by each are typically defined, at least in part, by the communication standard in use, for illustrative purposes, the architecture of the communication device 12 may be modeled as having four layers: a first layer referred to as an application layer 52; a second layer disposed beneath the application layer and referred to as a network layer 54; a third layer disposed beneath the network layer and referred to as a wireless hardware abstraction layer (WHAL) 56; and a fourth, bottom layer referred to as a physical layer 58. The application layer 52 represents any software instructions and hardware devices, such as the keypad and the microphone, that allow a user to interface with and operate the communication device 12. For example, when the user enters a telephone number at the keypad, the application layer 52 is invoked. Likewise, when the user speaks into the microphone, the voice data received at the microphone is initially handled by the application layer 52 that converts the voice data to a format that is recognizable to the network layer 54. The network layer 54 is driven by an apparatus referred to as a protocol engine that is implemented as a set of software instructions executed by the microprocessor 34 that allow the communication device 12 to use the proper protocol when communicating with the base station 10. For example, the protocol engine may convert voice data received from the user into a protocol that is compatible with the protocol used by the base station 10 and that conforms to the communication standard in use. In addition, the protocol engine may interpret/convert protocol-formatted signals received from the base station 10 into signals that may be used by the application layer 52 or any of the other layers of the communication device 12.

As will be understood by one having ordinary skill in the art, the communication protocol used by the base station 10 and the communication device 12 is conventionally defined by the communication standard in use. The protocol may define a format for communication signals and may further define a standard set of procedures that control the manner in which the communication device 12 and the base station 10 communicate. For example, the protocol may define a registration procedure that allows the communication device 12 to register with the base station 10 upon entering the cell serviced by the base station 10.

The protocol engine of the network layer 54 invokes the WHAL 56 which may be implemented using a set of instructions executed by the microprocessor 34 that enable communication between the network layer 54 and the physical layer 58. Specifically, the WHAL 56 translates a set of single statement instructions referred to as "function calls" provided by the protocol engine into a detailed and potentially complex set of instructions that may be used to direct the physical layer 58 to perform a specified set of tasks such as transmitting and receiving data. The physical layer 58 comprises a set of software instructions and hardware devices such as the DSP 36, data converters 42 and RF hardware devices 40 that are directly responsible for transmitting the data to the base station 10 and for receiving data from the base station 10.

Figure 6:
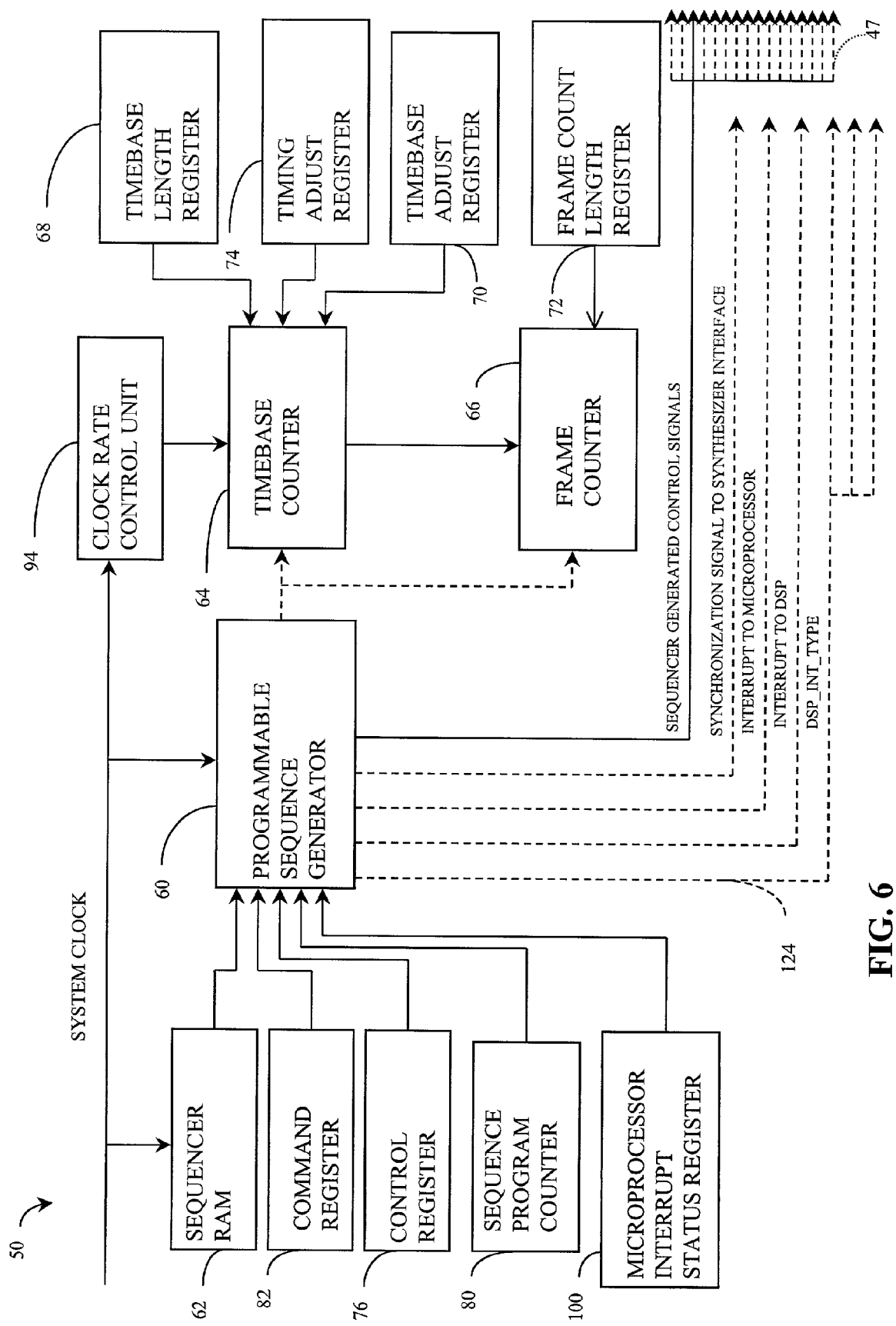
FIG. 6 is a block diagram of a system timer disposed in the mobile communication device of FIG. 4 and configured in accordance with the present invention.

Referring now to FIG. 6, the system timer 50 includes a programmable sequence generator ("the sequencer") 60 adapted to execute a set of instructions disposed in a random access memory ("sequencer RAM") 62 to thereby enable the generation of a set of control signals for controlling a set of counters 64, 66, and the RF hardware devices 40, and to enable the generation of a set of interrupt signals that interrupt the operation of the microprocessor 34 and the DSP 36. The system timer is further adapted to generate a pulse signal that is supplied to the synthesizer interface 46 for controlling the rate at which frequency information is supplied by the microprocessor 34 to the frequency synthesizer 44.

The set of counters 64, 66 controlled by the sequencer 60 may include, for example, a fifteen bit timebase counter 64 adapted to increment at a speed equal to a fraction of the symbol rate. Specifically, the timebase counter 64 is configurable to increment at a rate equal to $\frac{1}{32}$, $\frac{1}{16}$, $\frac{1}{8}$ or $\frac{1}{4}$ of the symbol rate when used in a TIA-EIA-136 communication system having a system clock rate operating at 19.44 MHz. Further the timebase counter 64 is configurable to increment at a rate equal to $\frac{1}{16}$, $\frac{1}{8}$, $\frac{1}{4}$ or $\frac{1}{2}$ of the symbol rate when used in a TIA-EIA-136 communication system having a system clock 24 operating at 9.72 MHz and in a GSM communication system having a system clock 24 operating at 13 MHz. The timebase counter 64 is further adapted to reset or wrap to zero when a nominal period of time has expired. More particularly, a value equal to the nominal period of time is stored in a timebase counter length register 68 such that whenever the timebase counter 64 increments to a value equal to the value stored in the timebase counter length register 68, the timebase counter 64 is reset or wraps to zero. The nominal period of time which may be, for example, 20 ms for a TIA-EIA-136 communication system and 4.615 ms for a GSM communication system, is typically equal to the amount of time required for the base station 10 to transmit a frame 26 of symbols. As will be understood by one having ordinary skill in the art, a "frame" is a term of art that generally refers to a discrete portion of a communication signal that may comprise, for example, a predefined number of symbols. Further, the term "frame" is a term of art that is typically defined according to a communication standard and thus the definition of the term may vary depending on the standard in use.

In addition, the system timer 50 may further include a timebase adjust register 70 that may be used to synchronize the communication device 12 with the base station 10. Specifically, the base station 10 determines an amount of time by which the timing of the communication device 12 is offset from the timing of the base station 10. The base station 10 then transmits this calculated offset to the communication device 12. The microprocessor 34 causes a value equal to the nominal time period plus the offset value to be stored in a timebase adjust register 70. The timebase counter 64 then uses the value stored in the timebase adjust register 70 as the wrap point for the next data frame 26 received at the communication device 12 causing the period of the timebase counter 64 to be extended or shortened by an amount of time equal to the offset. After the shortened/lengthened frame 26, the timebase counter 64 returns to wrapping to zero at the nominal time period stored in the timebase counter length register 68.

The counters 64, 66 may also include an eleven bit frame counter 66 adapted to increment each time the timebase counter 64 overflows so that the frame counter operates at the frame rate. The frame counter 66 is further adapted to reset or wrap to zero when a number of frames 26 equal to a number stored in a frame counter length register 72 have been counted. A timing adjust register 74 may further be included in the system timer 50 for storing timing adjustment values by which the timebase counter 64 may be adjusted. Specifically, the timing adjust register 74 may include a value by which the value stored in the timebase counter 64 is either incremented or decremented. Adjusting the operation of the timebase counter 64 using the timebase adjust 70 and timing adjust registers 74 will be described in greater detail below.

Figure 7:
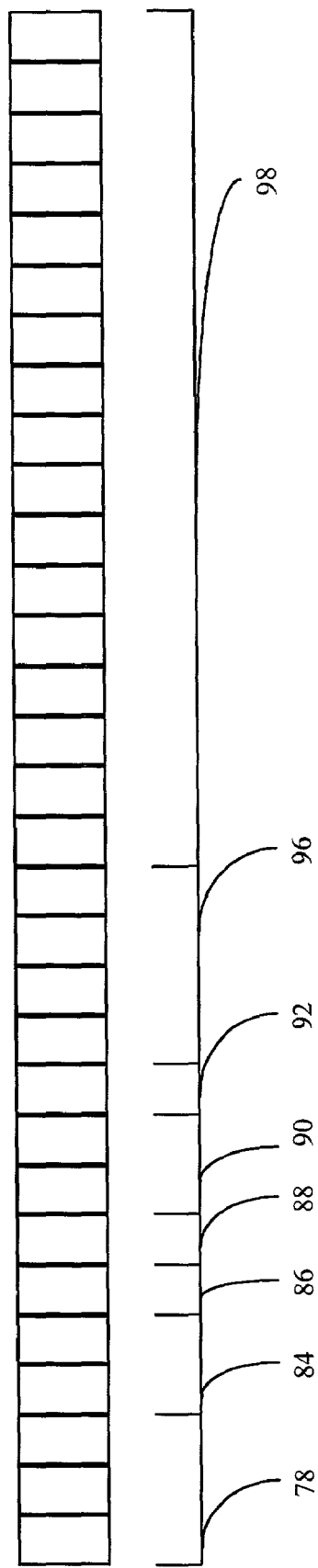
FIG. 7 is a diagram of the internal configuration of a control register shown in FIG. 6.

Referring also to FIG. 7, the sequencer 60 is adapted to execute the instructions stored in the sequencer RAM 62 according to the status of a set of control bits residing in a control register 76. Specifically, the control register 76 may include a set of bits that may be set by the microprocessor 34 to cause the sequencer 60 to operate in a particular manner. For example, the control register 76 may include a set of "RESET" bits 78 that allow the microprocessor 34 to reset one or more of a sequence program counter 80 (see FIG. 6), the frame counter 66 and/or the timebase counter 64. For example, if the RESET bits 78 are set to a first value of "000" then the sequencer 60 may take no action with respect to resetting any of counters 64, 66 and 80. If instead the RESET bits 78 are set to a second value of "001," then the sequencer 60 may cause the sequence program counter 80 to be set to a value equal to the last value stored in a command register 82. The command register 82 comprises a memory register in which addresses may be stored by the microprocessor 34 and the sequence program counter 80 is adapted to contain the address of the instruction currently being executed by the sequencer 60. Thus, moving an address from the command register 82 to the sequence program counter 80 causes the sequencer 60 to jump to and execute the instruction located at that address. As a result, the RESET bits 78 may be used to alter the sequence of instructions executed by the sequencer 60.

Alternatively, the RESET bits 78 may be set to a third value of "010" causing the sequence program counter 80 to be set to the starting address sequencer 60 instruction set stored in the RAM 62. In addition, the RESET bits 78 may be set to a value of "100" and "101," to reset or clear the timebase counter 64 or the frame counter 66, respectively. The action performed by the sequencer 60 upon setting the RESET bits 78 to one or more other values, such as "011," "110" and "111," may be defined in any of a number of ways as necessary to enhance the functionality of the system timer 50 and support the needs of the user of the mobile communication device 12.

A set of "INTSEL" bits 84 that are used to define a set of conditions that will cause the sequencer 60 to interrupt the microprocessor 34 may further be included in the control register 76. Specifically, if the INTSEL bits 84 are set to "00," then no interrupt signal is generated. Alternatively, if the INTSEL bits 84 are set to "01," then the sequencer 60 interrupts the microprocessor 34 when the timebase counter 64 overflows and, if the INTSEL bits 84 are set to "10," then the sequencer 60 interrupts the microprocessor 34 when the frame counter 66 overflows. If the INTSEL bits 84 are set to "11," then the sequencer 60 interrupts the microprocessor 34 when either the timebase counter 64 or the frame counter 66 overflows. As will be understood by one having ordinary skill in the art, an interrupt signal is typically supplied to the microprocessor 34 to inform the microprocessor 34 than an event has occurred upon which further action by the microprocessor 34 is contingent. For example, it may be desirable to retune the frequency synthesizer 44 to a new frequency after a predetermined number of frames 26 have been counted so that the communication device 12 may begin transmitting instead of receiving data. To inform the microprocessor 34 as to when the predetermined number of frames 26 have been counted, the system timer 50 may interrupt the microprocessor 34 in response to a frame counter 66 overflow condition. Unlike interrupt signals that are generated in response to the occurrence of a predefined condition, such as a frame counter or timebase counter overflow, interrupt signals that are generated by the sequencer 60 in response to a software instruction are always enabled so that a specific set of control register bits are not reserved for enabling an interrupt of this type.

Referring still to FIG. 7, the control register 76 may also include a "countrun" bit 86 that controls the operational state of one or both of the timebase and frame counters 64, 66 and a "seqrun" bit 88 that controls the operational state of the sequencer 60. For example, when the countrun bit 86 is high, the timebase and frame counters 64, 66 may be enabled, i.e., may count, and when the countrun bit 86 is low, the timebase and frame counters 64, 66 may be disabled and hold their current values. Similarly, when the seqrun bit 88 is high, the sequencer 60 executes instructions and when the seqrun bit 88 is low, the sequencer 60 stops executing instructions, i.e., halts.

The control register 76 may farther include a set of "CLKDIV" bits 90 and a "predivide" bit 92 that affect the manner in which a system clock signal is divided. Specifically, the predivide bit 92 dictates whether the system clock signal shall be divided by either twenty five (25) or by six (6). More particularly, the system clock signal, which is generated by a clock device (not shown) disposed in the communication device 12 and which is supplied to the sequencer 60, the sequencer RAM 62 and to a clock rate control unit 94, operates at the same frequency as the base station 10, i.e., 13 MHz in a GSM communication system and 19.44 MHz in an TIA-EIA-136 communication system. The system clock signal is thereafter divided at the clock rate control unit 94 by either 25 or 6, depending on whether the predivide bit 92 is set to a zero or a one, respectively, so that the communication device 12 may synchronize to the base station 10 within a resolution of ⅛th of a symbol (eight counts per symbol) or within a resolution of ¹⁄₂₄th of a symbol (wherein exactly three (3) sequencer instructions are executed for each count of the timebase counter 64) when operating in the GSM mode. Specifically, the TIA-EIA-136 signal frequency of 19.44 MHz is divided by 25 to obtain a resolution of ⅛th symbol and the GSM signal frequency of 13 MHz is divided by 6 to obtain a resolution of ⅛th symbol. In addition, the clkdiv bits 90 may dictate whether the system clock signal is further divided by either one (1), two (2), four (4) or eight (8). Thus, the clock rate control unit 94 divides the incoming clock signal according to the settings of the clkdiv and predivide bits 90, 92 stored in the control register 76.

The control register 76 may additionally include a set of MODE bits 96, denoted A', B', C', and D', that may be used to control whether the sequencer 60 will branch to a first address located in the sequencer RAM 62 or whether the sequencer 60 will instead branch to a second address located in the sequencer RAM 62. Further, a set of bits 98 may be included in the control register 76 and used for any desired purpose as necessary to enhance the functionality of the system timer 50. As will be appreciated by one having ordinary skill in the art, the microprocessor 34 may set the bits 78, 84, 86, 88, 90, 92, 96 and 98 residing in the control register 76 upon, for example, powering up the communication device 12 or when the communication device 12 changes operating frequency from a first frequency level, e.g., 30 kHz channel, to a second frequency level, e.g., 200 kHz channel.

Upon power up or when changing operating frequencies, the microprocessor 34 may also be programmed to initialize one or more of the counters 64, 66, 80, one or more of the registers 68, 72, 100 and the sequencer RAM 62. Specifically, the timebase counter length register 68 may be set to a predetermined value such as, for example, 3888 counts/frame for TIA-EIA-136 and 10000 counts/frame for GSM, and the frame counter length register 72 may be set to any value depending upon the application in which the system timer 50 is to be used. The programs to be executed by the sequencer 60 may also be copied from the memory device 48 associated with the microprocessor 34 to the sequencer RAM 62.

Figure 8:
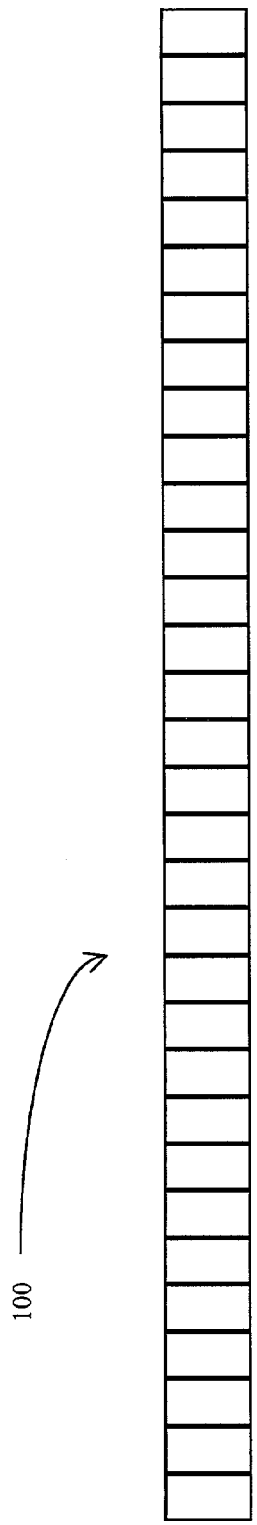
FIG. 8 is a diagram of the internal configuration of a microprocessor interrupt status register shown in FIG. 6.

Referring now to FIG. 8, in addition to the control register 76, the system timer 50 may also include a microprocessor interrupt status register 100 containing a set of bits that indicate which of a set of conditions caused the system timer 50 to interrupt the microprocessor 34. For example, the microprocessor interrupt status register 100 may include an "IS_TBCOUNT" bit 102 that is set when the system timer 50 interrupts the microprocessor 34 because of a timebase counter 64 overflow condition and may further include an "IS_FRCOUNT" bit 104 that is set when the system timer 50 interrupts the microprocessor 34 because of a frame counter 66 overflow condition. In addition, an "IS_SEQ" bit 106 may be set when the system timer 50 interrupts the microprocessor 34 as a result of a software instruction, referred to as an ARMINT instruction, that causes the system timer 50 to interrupt the microprocessor 34. A set of "IS_SEQTYPE" bits 108 may also be set to indicate the type of interrupt that was generated as a result of the ARMINT software instruction. Specifically, the IS_SEQTYPE bits 108 may be set by the sequencer 60 using type information contained in a type field included in the ARMINT instruction. An additional set of bits 110 may further be included in the microprocessor interrupt status register 100 and may be defined to indicate that any desired type of microprocessor interrupt signal has been generated as needed to enhance the functionality of the system timer and to support the needs of the user of the communication device 12. After an interrupt signal has been received by the microprocessor 34, the microprocessor 34 reads the information contained in the interrupt status bit register 100 to determine the cause of the interrupt so that an appropriate action may be taken and then causes the contents of the register 100 to clear. Of course, if an event occurs that may potentially cause an interrupt but that is not enabled via the INTSEL bits 84 disposed in the control register 76, then the interrupt signal will not be generated and, likewise, the interrupt status bits associated with the cause of the interrupt signal will not be set.

Referring also to FIGS. 6 and 9, the order in which the instructions stored in the sequencer RAM 62 are executed by the sequencer 60 depends, at least in part, upon whether a "JCMD" instruction 112, formatted as "JCMD aaaa aaaa," has been encountered by the sequencer 60 and upon whether the command register 82 is empty when the JCMD instruction 112 is executed. More particularly, the sequencer 60 executes the instructions located at a set of specified addresses in the sequencer RAM 62 in the order that the instructions are arranged in the sequencer RAM 62, until a JCMD instruction 112 is encountered. When a JCMD instruction 112 is encountered, the sequencer 60 examines the contents of the command register 82 to determine whether the command register 82 is empty. If the command register 82 is empty, the sequencer 60 jumps to and executes the instruction located at an address specified in the address field, "aaaa aaaa," of the JCMD instruction 112. After executing the instruction located at the specified address, the sequencer 60 returns to executing the instructions in the order in which they are arranged by executing the instruction located at the next consecutive address in the sequencer RAM 62. If the command register 82 is not empty when the JCMD instruction 112 is executed, the sequencer 60 jumps to and executes the instruction located at the sequencer RAM address that is stored in the command register 82. The sequencer 60 then executes the instruction stored in the next, consecutive sequencer RAM 62 address and continues in this fashion until a JCMD instruction 112 is again encountered. The addresses stored in the command register 82 are extracted by the sequencer 60 in a first-in/first-out manner wherein the first address stored in the command register 82 is the first address to be extracted by the sequencer 60 when a JCMD instruction 112 is encountered and for each additional JCMD instruction 112 executed, the sequencer 60 continues to extract addresses according to the order in which the addresses were written to the command register 82. Thus, the order in which instructions are executed by the sequencer 60 is not limited to the order in which the instructions are stored in the sequencer RAM 62 but may instead be altered by the microprocessor 34. To eliminate the need to frequently update the command register 82 during each frame 26, the microprocessor 34 may cause a set of addresses to be stored in the command register 82 once before each frame 26.

Referring still to FIGS. 6 and 9, in addition to the JCMD instruction 112 described above, the sequencer RAM 62 may be used to store any number of instructions, including instructions that cause the sequencer 60 to conditionally jump to a specified address in the sequencer RAM 62, instructions that cause the sequencer 60 to set or clear specific system timer 50 outputs, instructions that cause the sequencer 60 to supply an interrupt signal to either the microprocessor 34 or the DSP 36, and instructions that cause the sequencer 60 to generate control signals for controlling the synthesizer interface 46 and the RF hardware devices 40. Moreover, the instructions may cause the sequencer 60 to perform the above-listed tasks in any number of ways. For example, the instructions that cause the sequencer 60 to jump to a new address in the sequencer RAM 62 may cause the sequencer 60 to jump conditionally or unconditionally. Specifically, a conditional "JMP" instruction 114 may be formatted as "JMP ABCD aaaa aaaa" and may cause the sequencer 60 to jump to an address specified in the address field "aaaa aaaa" of the JMP instruction 114, if the result of an equation is zero. The equation used to determine whether a jump shall occur may depend upon the values of the MODE bits A', B', C' and D' stored in the control register 76 and a set of bits A, B, C and D having values that are supplied in the "ABCD" field of the JMP instruction 114, and may further depend upon the value of a bit denoted, TX_ENA, as follows:

$$\text{RESULT} = A \cdot A' + B \cdot B' + C \cdot C' + D \cdot D' \cdot TX\_ENA$$

The TX_ENA bit is set by the DSP 36 when data is available at the physical layer for transmission to the base station 10 and may be stored, for example, in an interface register 116 that operates as a shared memory interface between the microprocessor 34, the DSP 36 and the system timer 50. The interface register 116 may be implemented via a memory location that is readable by the microprocessor 34, the system timer 50 and the DSP 36 and that may be written to by the microprocessor 34 and the DSP 36. The JMP instruction 114 may be used, for example, to cause the sequencer 60 to continue to loop through a set of instructions beginning at the address specified in the address field of the JMP instruction 114 and ending at the address where the JMP instruction 114 is located until a desired condition has been met. To use the JMP instruction 114 in this manner, the bits A, B. C and D may be set to a logic level high in the "ABCD" field of the JMP instruction 114 and the bits A', B', C' and D' may all be set to a logic level zero until a desired condition has been met at which time one or more of the MODE bits, A', B', C' and/or D', is set to a logic level high. Thus, when the bits in the "ABCD" field of the JMP instruction 114 are set to a logic level high and the MODE bits, A', B', C' and D,' are set to a logic level low, "RESULT" is a logic level low causing the sequencer 60 to jump to the address provided in the address field of the JMP instruction 114. The RESULT will remain at a logic level low until one or more of the mode bits A', B', C' are set to a logic level high and/or until the bits D' and TX_ENA are set to a logic level high at which time the JMP instruction 114 will cause the sequencer 60 to execute an instruction that immediately follows the JMP instruction 114. Thus, the JMP instruction 114 may cause the sequencer 60 to continuously execute or loop through the same set of instructions until a desired condition has been met.

By way of further example, the JMP instruction 114 may also be used to control whether a set of instructions that enable data transmission by the communication device 12 are executed within a given frame. Specifically, the TX_ENA and the D' bits may be set to a logic level low when data is not available for transmission because, for example, the user of the communication device 12 is not speaking during a telephone call. Setting the TX_ENA and D' bits to a logic level low causes RESULT to be equal to a logic level low (provided of course that the MODE bits A', B'and C' are set to a logic level low) causing the sequencer 60 to skip a set of instructions that are located after the JMP instruction 114 and to instead jump back to the set of instructions that begin at the address specified in the address field of the JMP instruction 114. In contrast, when the TX_ENA and D' bits are set to a logic level high, the sequencer 60 will not jump back to the address specified in the address field of the JMP instruction 114 but will instead execute the set of instructions that are located after the JMP instruction 114. Thus, provided that the instructions located after the JMP instruction 114 enable the transmitter and data transmission, the JMP instruction 114 may be used to control whether the transmitter and data transmission are enabled. As will be appreciated by one having ordinary skill in the art, the transmitter typically represents a large load on a power supply (not shown) used to energize the communication device 12 such that skipping the set of instructions that enable the transmitter, when possible, may result in significant battery power conservation.

Referring still to FIGS. 6 and 9, the instructions stored in the sequencer RAM 62 may further include instructions that cause the sequencer 60 to set a group of system timer outputs denoted, SYSTIMERm, SYSTIMERk and SYSTIMERj, equal to either a logic level one or a logic level zero. Specifically, a "SET" instruction 117 formatted as "SET mmmm, kkkk, jjjj" may cause the sequencer 60 to set the SYSTIMERm, SYSTIMERk and SYSTIMERj outputs to a logic level high. Further, a "CLR" instruction 118, formatted as "CLR mmmm, kkkk, jjjj," may cause the sequencer 60 to set the SYSTIMERj, SYSTIMERk and SYSTIMERm outputs to a logic level zero. Alternatively, the SET and CLR instructions 117, 118 may instead be used to set a single one of the system timer outputs to a logic level one or logic level zero, respectively, by setting the values in the mmmm, kkkk, jjjj fields in the instructions 117, 118 equal to each other.

A "DSPINT" instruction 120 and an "ARMINT" instruction 122 formatted "DSPINT tttt" and "ARMINT tttt," respectively, may cause the sequencer 60 to supply an interrupt signal to the DSP 36 and to the microprocessor 34, respectively. The sequencer 60 may supply any of several different types of interrupt signals to the DSP 36 wherein the type of the interrupt signal is specified in the type field, "tttt," of the DSPINT instruction 120 and is further supplied by the sequencer 60 to the DSP 36 on a set of three output pins 124, denoted DSP_INT_TYPE, that are coupled between the system timer 50 and the DSP 36. Thus, the sequencer 60 sets the DSP_INT_TYPE output pins 124 according to the type of interrupt generated so that the DSP 36 may respond to the interrupt appropriately. In addition, the sequencer 60 may supply any of several different types of interrupt signals to the microprocessor 34. The sequencer 60 indicates the type of interrupt signal, which is dictated by the type field "tttt tttt," of the ARMINT instruction 122, by setting the IS_SEQTYPE bits in the microprocessor interrupt status register 100. Upon receiving an interrupt signal, the microprocessor 34 reads the IS_SEQTYPE bits in the interrupt status register 100 and then clears the interrupt status register 100.

The sequencer RAM 62 may also be used to store a "SYNSEND" instruction 126 that causes the sequencer 60 to provide a pulse signal to the synthesizer interface 46 which is used to tune the receiver and transmitter associated with the RF hardware devices 40 to an appropriate frequency. The microprocessor 34 supplies a set of data words that may define, for example, the appropriate frequency(ies) to which the RF hardware devices 40 shall be tuned, to the synthesizer interface 44 which, in turn, supplies the data words to the frequency synthesizer 44. The synthesizer interface 46 may operate in either of two modes, both of which affect the manner in which the synthesizer interface 46 supplies the data words to the frequency synthesizer 44. Specifically, in an immediate mode, the microprocessor 34 writes a data word to a register 128 disposed in the synthesizer interface 46 referred to as the synthesizer interface immediate register (IMMD) 128 and the synthesizer interface 46 responds by immediately sending the data word, which may comprise, for example, one (1) to eighty (80) bits, at a rate of one bit per clock count to the frequency synthesizer 44. In a timed mode, the microprocessor 34 queues up words to be sent to the frequency synthesizer 44 by writing the data words into a set of nine registers (not shown) that are disposed in the synthesizer interface 46. The system timer 50 then acts as a timing agent to control when the synthesizer interface 46 actually sends the data. Specifically, each time a "SYNSEND" instruction 126 is encountered by the sequencer 60, the sequencer 60 sends a pulse signal to the synthesizer interface 46 to command it to send out a one (1) to eighty (80) bit word to the frequency synthesizer 44. A timed mode bit (not shown) disposed in the synthesizer interface 46 determines whether a single pulse signal received from the sequencer 60 will cause only a single frequency word to be sent to the frequency synthesizer 44 or whether a single pulse will cause all frequency words to be sent to the frequency synthesizer 44 sequentially.

Referring still to FIGS. 6 and 9, the sequencer RAM 62 may also be used to store instructions that cause the sequencer 60 to generate signals for controlling the receiver and transmitter associated with the RF hardware devices 40. Specifically, an "RXENA" instruction 132 causes the sequencer 60 to generate a control signal that is supplied to the RF hardware devices 40 and that causes the receiver to be enabled and that further causes a set of bits received by the receiver to be placed into a memory stack (not shown) associated with the receiver. Similarly, an "RXDIS" instruction 133 causes the sequencer 60 to generate a control signal that is supplied to the RF hardware devices 40 and that causes the receiver to be disabled. A "TXSTART" instruction 134 causes the sequencer 60 to generate a control signal that is supplied to the RF hardware devices 40 to enable data transmission. Specifically, the control signal may cause a modulator co-processor (not shown) associated with the transmitter to modulate a set of bits stored in a memory stack (not shown) associated with the transmitter and may further cause the transmitter to begin transmitting the modulated bits via a transmission burst. As will be understood by one having skill in the art, a "burst" is a term of art that generally refers to a signal having a short, defined duration. Moreover, "burst" is term of art that is typically defined according to a communication standard and thus the definitions of the term may vary depending on the standard in use.

A further set of instructions that cause the sequencer 60 to wait a specified length of time before executing the next instruction, and that further cause the sequencer 60 to increment and/or decrement the value held in the timebase counter 64 by a specified amount of time may also be stored in the sequencer RAM 62. Specifically, an "RTBWAIT" instruction 136 formatted as "RTBWAIT w" causes the sequencer 60 to wait a length of time equal to the value specified in the field, "w," of the RTBWAIT instruction 136, an "FRWAIT" instruction 138 formatted as "FRWAIT d" causes the sequencer 60 to wait until the value stored in the frame counter 66 is equal to the value of specified in the field, "d," of the FRWAIT instruction 138, and a "TBWAIT" instruction 140 formatted as "TBWAIT d" causes the sequencer 60 to wait until the value in the timebase counter 64 is equal to the value specified in the field, "d," of the TBWAIT instruction 140. Further, a "TBADJSN" instruction 142 formatted as "TBADJSN d" causes the sequencer 60 to increment (if the value of d is equal to a logic level 1) or decrement (if the value of d is equal to a logic level zero) the value stored in the timebase counter 64 by an amount equal to a value stored in the timebase adjust register 70. The value stored in the timebase counter 64 is adjusted in this manner to synchronize the communication device 12 with the base station 10.

Referring still to FIGS. 6 and 9, in addition to the instructions described above, the instructions stored in the sequencer RAM 62 may further include an "NOP" instruction 144 that causes the sequencer 60 to continue to the instruction located at the next consecutive address in the event that an instruction has not been written to the current address. Thus, instead of generating an error signal and potentially halting operation when an address having no instruction is encountered, the sequencer 60 merely proceeds to the instruction located at the next consecutive address in the sequencer RAM 62.

Figure 10:
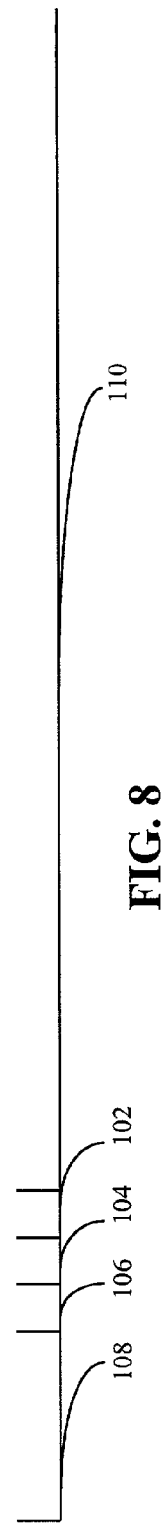
FIG. 10 is a table having a set of interrupt signals that may be supplied by the system timer of FIG. 4 to the DSP of FIG. 4.

Referring now to FIG. 10, the sequencer 60 may supply different types of interrupt signals to the DSP 36, each of which may cause the DSP 36 to respond in a different, predefined manner. The system timer 50 indicates the type of interrupt signal by setting the DSP_INT_TYPE output pins 124 which are coupled to the DSP 36. A first type of interrupt signal referred to as an invalid interrupt 146 and represented by setting the DSP_INT_TYPE output pins 124 to "000" may be used to indicate that an invalid interrupt 146 has been generated and may cause the DSP 36 to report to the microprocessor 34 that an invalid interrupt has been received with a request that the microprocessor 34 respond with instructions as to what actions, if any, should be taken in response to the invalid interrupt.

A second type of interrupt, referred to as a frame interrupt 148 and represented by setting the DSP_INT_TYPE output pins 124 to "001" may be used to instruct the DSP 36 to trigger a procedure wherein a downlink data transfer and an uplink data transfer are performed. During the downlink data transfer, the DSP 36 causes a frame 26 of data received from the base station 10 at the RF hardware devices 40 to be stored in a first pre-designated memory location and then supplies an interrupt signal to the microprocessor 34 informing the microprocessor 34 that the frame 26 of data has been stored in the first pre-designated memory location. The microprocessor 34 responds to the interrupt signal by reading the first pre-designated memory location to retrieve the frame 26 of data therefrom. During the uplink data transfer, the microprocessor 34 causes a frame 26 of data to be stored in a second pre-designated memory location and then supplies an interrupt signal to the DSP 36 informing the DSP 36 that the frame 26 of data has been stored in the second pre-designated memory location. The DSP 36 responds to the interrupt signal supplied by the microprocessor 34 by retrieving the frame 26 of data from the second pre-designated memory location and then causes the frame 26 of data to be transmitted to the base station 10 via the RF hardware devices 40.

A third type of interrupt, referred to as an RXWin interrupt 150 and represented by setting the DSP_INT_TYPE output pins 124 to "010," may be used to instruct the DSP 36 to enable the receiver associated with the RF hardware devices 40 so that the receiver may begin receiving data. A fourth type of interrupt, referred to as a TXWin interrupt 152 and represented by setting the DSP_INT_TYPE output pins 124 to "011," may be used to instruct the DSP 36 to enable the transmitter associated with the RF hardware devices 40, to begin transmitter ramp-up operation and to modulate a burst of data stored in a memory device (not shown) associated with the transmitter.

A fifth type of interrupt, referred to as a handoff interrupt 154 and represented by setting the DSP_INT_TYPE output pins 124 to "101," may be used to instruct the DSP 36 to enable the receiver to take off-channel signal strength and signal timing measurements. As will be understood by one having ordinary skill in the art, a communication device 12 may either communicate with the base station 10 directly or the base station 10 may serve as a conduit through which communication with a second mobile communication device may be routed. Moreover, the frequencies at which the two different types of communication are conducted are different. Specifically, when the communication device 12 is sending communication signals to the base station 10 for further routing, the communication device 12 may be tuned to a first frequency and is described as being "on-channel." In contrast, when communicating with the base station 10 directly, the communication device 12 may be tuned to a second frequency and is described as being "off-channel." As will further be understood by one having ordinary skill in the art, the communication device 12 may take signal strength and signal timing measurements off-channel for a variety of purposes including, for example, to enable a mobile assisted handoff. More particularly, and as will be understood by one having ordinary skill in the art, a mobile assisted call handoff procedure is typically performed when a communication device 12 is traveling from a first cell 14 that is serviced by a first base station 10 to a second, neighboring cell 14 that is serviced by a second, neighboring base station 10. Specifically, when traveling from the first cell 14 to the second cell 14, the first base station 10 causes the communication traffic associated with the communication device 12 to be transferred to and routed through the second base station 10. The procedure typically involves obtaining a frequency at which communication may occur between the second base station 10 and the communication device 12, and causing the communication device 12 to retune to the assigned frequency. Generally, the procedure may further involve any number of additional steps performed at any of the first and second base stations 10 and the communication device 12.

A sixth type of interrupt, referred to as an APC interrupt 156 and represented by setting the DSP_INT_TYPE output bits 124 to "110," may be used to instruct the DSP 36 to perform automatic power control. To perform automatic power control, the DSP 36 supplies a digital power control signal to one or more of the digital to analog converters 42 which then supplies a resulting analog power control signal to the transmitter associated with the RF hardware devices 40. The analog power control signal controls the power level at which the transmitter operates.

In addition, a seventh type of interrupt, referred to as a TXWinOff 158 interrupt and represented by setting the DSP_INT_TYPE bits to "111," may be used to instruct the DSP 36 to stop performing automatic power control, to begin transmitter ramp-down operation and to disable the transmitter. The timing at which the DSP 36 stops performing automatic power control, and ramps down/disables the transmitter depends on whether normal or shortened communication burst modes are in use. Specifically, and as will be understood by one having ordinary skill in the art, the TIA-EIA-136 communication standard allows for bursts of differing lengths and, as a result, the timing at which the events associated with the TxWinOff interrupt 158 are performed will vary depending on the length of the bursts in use.

An eighth type of interrupt 157 may be represented by setting the DSP_INT_TYPE bits to 100 and may be reserved for performing a function to be assigned at a later time to enhance the flexibility of the system timer 50 and to meet the needs of the user of the communication device 12.

Figure 11:
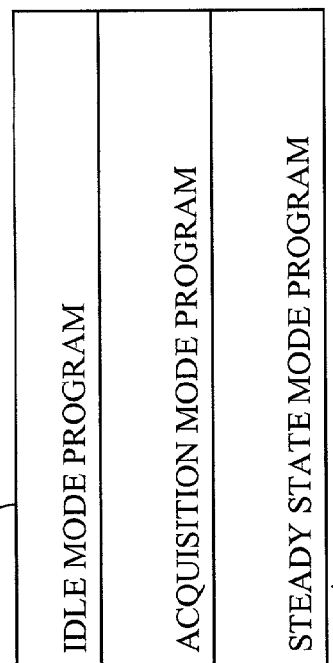
FIG. 11 is a block diagram illustrating a set of mode programs stored in the sequencer RAM associated with the system timer.

Referring now to FIG. 11, the system timer 50 may be adapted to execute any number or variety of instructions, including the instructions described above, in any desired sequence depending upon the type of system or device in which the system timer 50 is disposed. For example, if the system timer 50 is disposed in the communication device 12 shown in FIG. 4, then the sequencer 60 may be programmed to execute instructions that allow the mobile device to synchronize with the base station 10 to thereby enable communication between the communication device 12 and the base station 10. More specifically, the system timer 50 may be programmed to perform tasks that support functions performed by the various layers 52, 54, 56 and 58 (see FIG. 5) associated with the communication device 12.

Thus, for example, if the physical layer 58 is configured to operate in three different modes including an Idle mode, an Acquisition mode and a Steady State mode, then the system timer 50 may also be configured to operate in three different modes by programming the sequencer 60 to execute a different set of instructions for each mode. More particularly, an Idle mode program 160, an Acquisition mode program 162 and a Steady State mode program 164 may each be stored at a different set of memory locations in the sequencer RAM 62, each of which begins with a different starting address. When transition between the mode programs 160, 162 and 164 is appropriate, the WHAL 56 may write the starting address of an appropriate one of the programs to the command register 82 so that, when a JCMD instruction 112 is executed by the sequencer 60, the sequencer 60 jumps to the address written in the command register 82 and thus begins to execute the first instruction stored at the starting address of the corresponding program.

Figure 12:
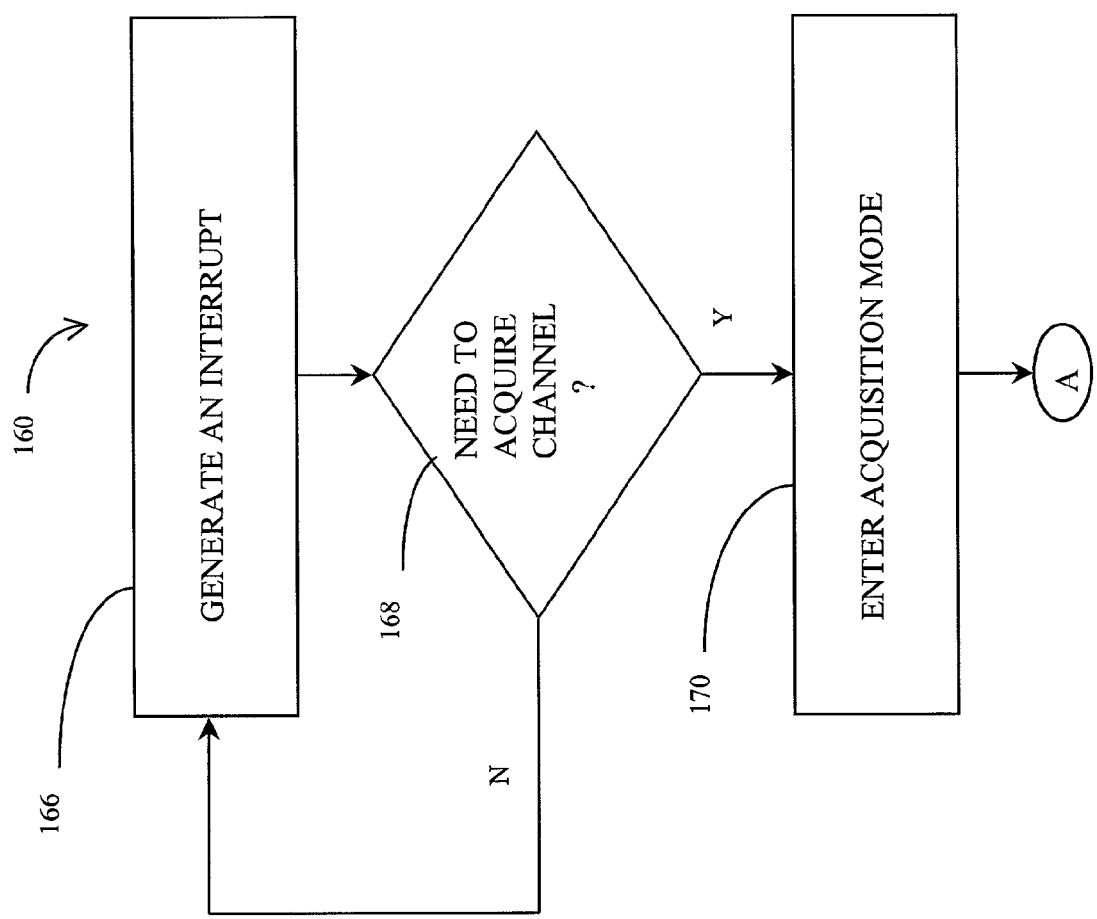
FIG. 12 is a flow chart illustrating a method of system timer operation associated with an Idle mode.

Referring now to FIG. 12, the system timer 50 may use the Idle mode program 160 to control the timing of the communication device 12 when the communication device 12 is powered up but not in use. Further, when operating in the Idle mode, the sequencer 60 may send a frame-type interrupt signal to the DSP 36 causing the DSP 36 to make any received data available to the microprocessor 34 (step 166). Specifically, the sequencer 60 may execute, for example, a DSPINT instruction 120 having a type field that indicates a frame interrupt signal 148. After the frame-type interrupt has been generated, the sequencer 60 may either enter the Acquisition mode or may remain in the Idle mode depending on the outcome of a conditional jump instruction (step 168), which may be implemented using a JCMD instruction 112. The jump instruction may cause the sequencer 60 to jump to the starting address of the Acquisition mode program 162 (step 170) which the microprocessor 34 will have stored in the command register 82 if transition to the Acquisition mode program 162 is appropriate. Alternatively, if the command register 82 is empty, the sequencer 60 instead loops back to the start of the Idle mode program 160 where an interrupt signal is again generated (step 166).

When the communication device 12 needs to acquire a communication channel, which may occur, for example, when a user attempts to initiate a telephone call, the communication device 12 transitions to the Acquisition mode program 162. More particularly, and referring now to FIG. 13 which aligns with FIG. 12 at connecting point A, the Acquisition mode program 162 may be initiated when the WHAL 56 writes the starting address of the Acquisition mode program 162 in the command register 82 in response to a communication channel setup command received from the protocol engine. When a communication channel is needed, the protocol engine may use an appropriate function call to instruct the WHAL 56 to set up, or acquire, either a control channel or a traffic channel causing the WHAL 56 to write the starting address of the Acquisition mode program 162 to the command register 82. As a result, the sequencer 60 jumps to the starting address of the Acquisition mode program 162 when the JCMD instruction 112 is executed during the Idle mode program 160 (step 168). As will be understood by one having ordinary skill in the art, a control channel is a communication channel that is reserved for transmitting control information from the base station 10 to the communication device 12 and a traffic channel is a communication channel that is reserved for communication between a first communication device 12 and a second communication device (either mobile or stationary) that is routed through the base station 10.

Although the steps of the Idle mode program 160, as described above, may be appropriate for a communication device 12 configured to operate in a TIA-EIA-136 communication system as well as a GSM communication system, a set of steps associated with the Acquisition mode program 162 may vary depending upon the communication system in which the communication device 12 is configured to operate. If the communication device 12 is configured to operate in a TIA-EIA-136 communication system, then, when operating in the Acquisition mode the sequencer 60 may send an RxWin-type interrupt 150 to the DSP 36 causing the DSP 36 to enable the receiver and begin receiving data from the base station 10 (step 172). The sequencer 60 may generate the RxWin-type interrupt 150, for example, in response to a DSPINT instruction 120 having a type field that indicates an RxWin-type interrupt 150. After generating the RxWin-type interrupt 150, the sequencer 60 may generate a further interrupt causing the DSP 36 to make the received data available to the microprocessor 34 for processing (step 174). For example, the sequencer 60 may generate the frame-type interrupt 148 by executing a DSPINT instruction 120 having a type field that indicates a frame-type interrupt 148. The microprocessor 34 may use the data received from the DSP 36 during the frame-type interrupt 148 to determine whether a channel has been successfully acquired by measuring, for example, burst position data and burst quality data. The microprocessor 34 may examine the data to determine, for example, whether the bursts are located at expected, predefined positions and whether the burst quality exceeds a predetermine threshold. If the measured data indicates that a control channel has been successfully acquired, the WHAL 56 writes the starting address of the Steady State program 164 into the command register 82. After the sequencer 60 generates the frame-type interrupt 148 (step 174), the sequencer 60 may execute a jump instruction (step 176), implemented using the JCMD instruction 112, causing the sequencer 60 to either jump to the starting address of the Steady State mode program 164 stored in the command register 82 (step 178) (if a channel has been successfully acquired) or return to the starting address of the Acquisition mode program 162 (step 172) so that a repeated attempt at channel acquisition may be performed.

Figure 13:
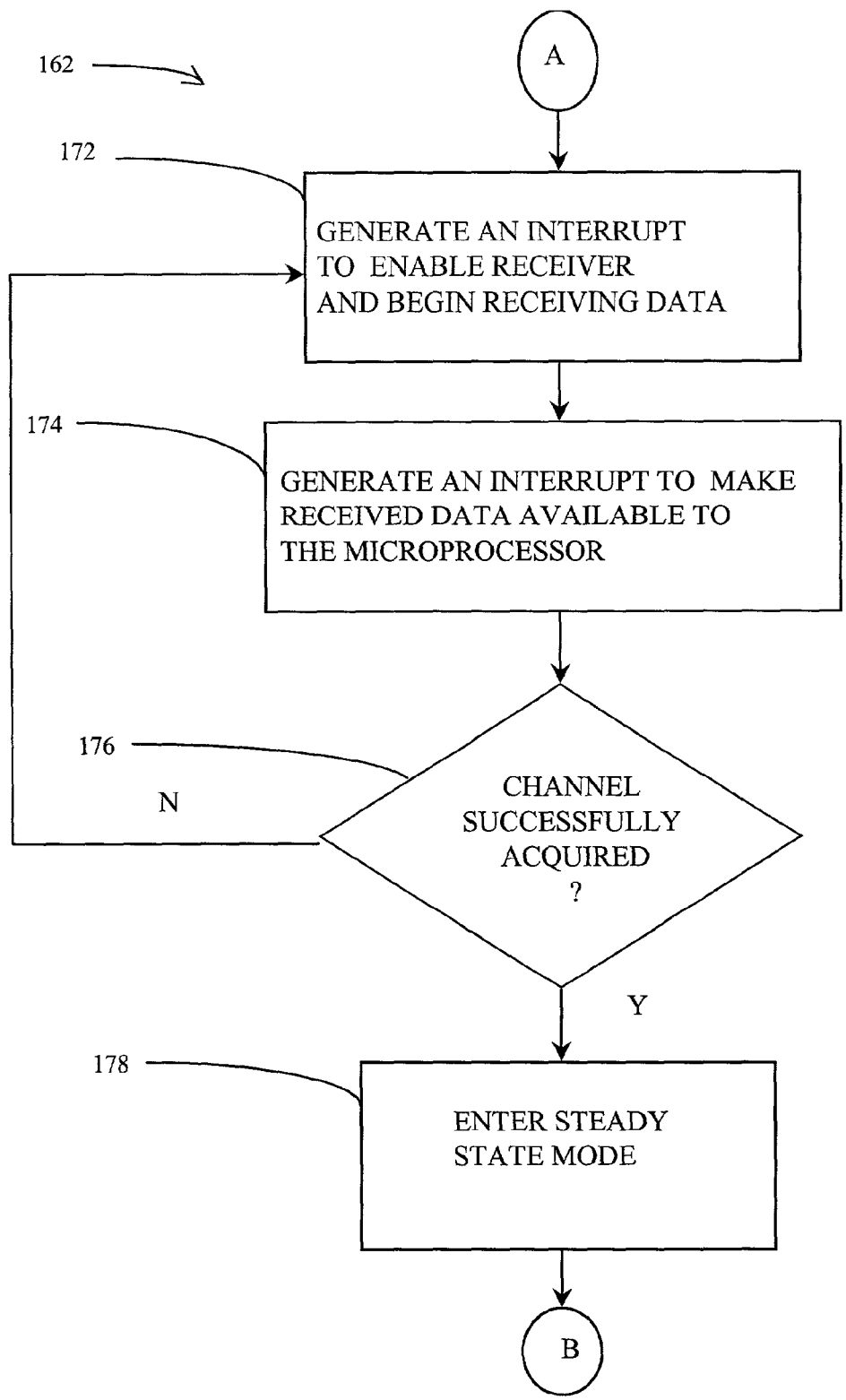
FIG. 13 is a flow chart illustrating a first method of system timer operation associated with an Acquisition mode.

Referring still to FIG. 13, if the communication device 12 is instead configured to operate in a GSM communication system, the system timer 50 may be configured to perform similar tasks in a different manner during the Acquisition mode. For example, when operating in the Acquisition mode the sequencer 60 may enable the receiver and cause a set of received data symbols to be placed into a memory stack associated with the receiver by sending a control signal directly to the RF hardware devices 40 instead of supplying an interrupt signal to the DSP 36 to accomplish the receiver enabling tasks. Specifically, the sequencer 60 may enable the receiver in response to an RXENA instruction 132 instead of executing a DSPINT instruction 120 having a type field that indicates an RxWin-type interrupt 150 as was used when configured for operation in a TIA-EIA-136 communication system. An RXENA instruction 132 may be preferable to using a DSPINT instruction 120 while operating in a GSM communication system due to the shorter frame lengths and thus, tighter timing requirements associated with the GSM communication protocol. More particularly, an RXENA instruction 132 allows the sequencer 60 to enable the receiver directly. In contrast, a DSPINT instruction 120 having a type field indicating an RXWin-type interrupt 150 does not directly enable the receiver but instead causes the sequencer 60 to interrupt the DSP 36 which, in turn, responds to the interrupt by enabling the receiver and associated hardware 40. Thus, an RXENA instruction 132, having fewer steps, enables data reception sooner than an RXWin-type interrupt 150 and therefore may be preferable when operating in a GSM communication system.

Further, when the incoming data has been received at the receiver and transferred to the DSP 36, the DSP 36 may also perform a set of tasks necessary to extract control data from the received data stream (step 172). For example, the DSP may search a first data frame 26 for a frequency correction burst ("FCB") that comprises a specific, predefined bit pattern that when, properly modulated, will result in a pure sine wave having a predefined length. Once the location of the FCB within the frame is known, the DSP 36 searches the same location in other subsequently received frames to confirm the location of the FCB. In addition, the DSP 36 may use information contained in the FCB to determine a bit offset that indicates the amount by which the timing of the communication device 12 is offset from the timing of the base station 10. Once determined, the bit offset may be used to calculate the time at which the next slot will be received at the communication device 12 so that the DSP 36 can enable receipt of the next slot at the proper time. Next, the DSP 36 may use the location of the FCB to enable receipt of a synchronization correction burst ("SCB"located a fixed distance from the position of the FCB and the DSP 36 may demodulate and decode the SCB. Finally, the sequencer 60 may generate a frame interrupt 148 so that the decoded SCB is forwarded by the DSP 36 to the microprocessor 34 (step 174) which uses the SCB to obtain information that identifies the base station 10 that transmitted the SCB and to obtain information that allows the communication device 12 to fully synchronize with the base station 10 and complete channel acquisition. Depending on whether a channel was successfully acquired (step 176), the sequencer 60 may then either enter the Steady State mode (step 178) or remain in the Acquisition mode (step 172) so that a second attempt at channel acquisition may be performed. As will be appreciated by one having ordinary skill in the art, the steps described above for processing off-channel data received while operating in the Acquisition mode may include a fewer or greater number of steps and are intended to be illustrative only. Further, the system timer 50 may be programmed as necessary to support any data processing tasks performed by the various layers associated with the communication device 12.

Figure 14:
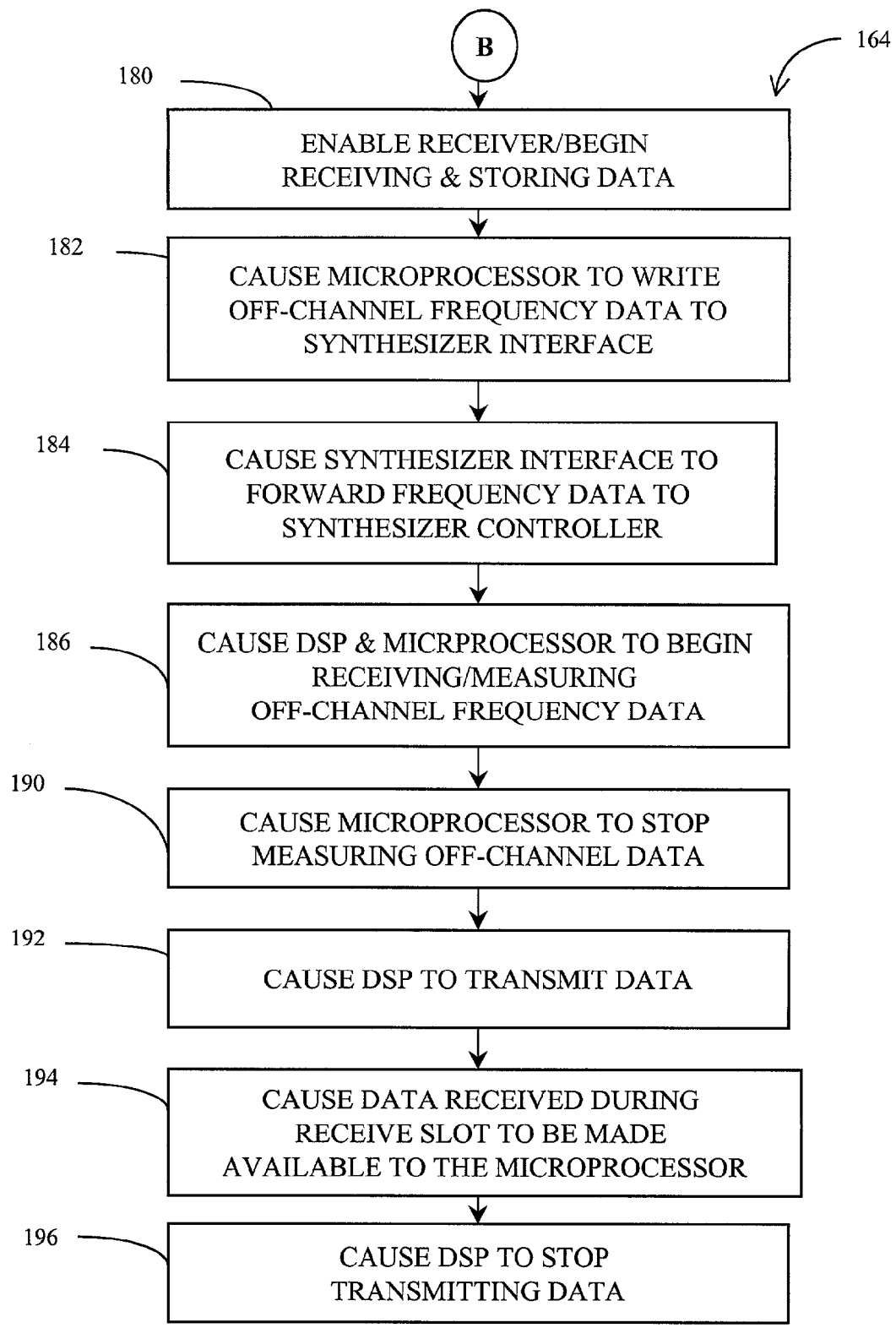
FIG. 14 is a flow chart illustrating a first method of system timer operation associated with a Steady State mode.

Referring now to FIG. 14 which aligns with FIG. 13 at connecting point B, the steps performed during the Steady State mode program 164 may also vary depending upon the type of communication system in which the communication device 12 is being used. For example, when configured for a TIA-EIA-136 communication system, the sequencer 60 may, in response to a DSPINT instruction 120 having a type field that indicates an RXWIN-type interrupt 150, cause the DSP 36 to enable the receiver associated with the RF hardware devices 40 and begin receiving data from the base station 10 until the receive slot has ended (step 180). After the receive slot has ended, the sequencer 60 may prepare for the handoff slot by interrupting the microprocessor 34 in response to an ARMINT instruction 122 thereby causing the microprocessor 34 to write off-channel frequency data to the synthesizer interface 46 (step 182). Further, the sequencer 60 may execute a SYNSEND instruction 126 causing the synthesizer interface 46 to forward the off-channel frequency data to the synthesizer controller 44 (step 184) which may use the data to tune the receiver associated with the RF hardware devices 40 to an appropriate off-channel frequency level so that handoff data may be collected. After the receiver is properly tuned, the sequencer 60 may interrupt the DSP 36 and the microprocessor 34 to enable the receipt and measurement of off-channel data (step 186). Specifically, the sequencer 60 may execute a DSPINT instruction 120 having a type field that indicates a handoff-type interrupt 154 and the sequencer 60 may further execute an ARMINT instruction 122. After the off-channel data has been measured by the microprocessor 34, the sequencer 60 may again interrupt the microprocessor 34 in response to another ARMINT instruction 122 to thereby disable the recording of off-channel data measurements (step 190). After the handoff slot, at the start of the transmit slot, the sequencer 60 may generate an interrupt causing the DSP 36 to transmit data (step 192) and, during the transmit slot, the sequencer 60 may further generate a frame interrupt causing the frame 26 of data received by the DSP 36 during the receive slot to be made available to the microprocessor 34 (step 194). At the end of the transmit slot, the sequencer 60 may interrupt the DSP 36 causing the DSP 36 to stop transmitting data (step 196). The sequencer 60 may enable and disable data transmission via, for example, the execution of DSPINT instructions 120 having type fields that indicate a TxWin-type interrupt 152 and a TxWinOff-type interrupt 158, respectively.

Figure 15:
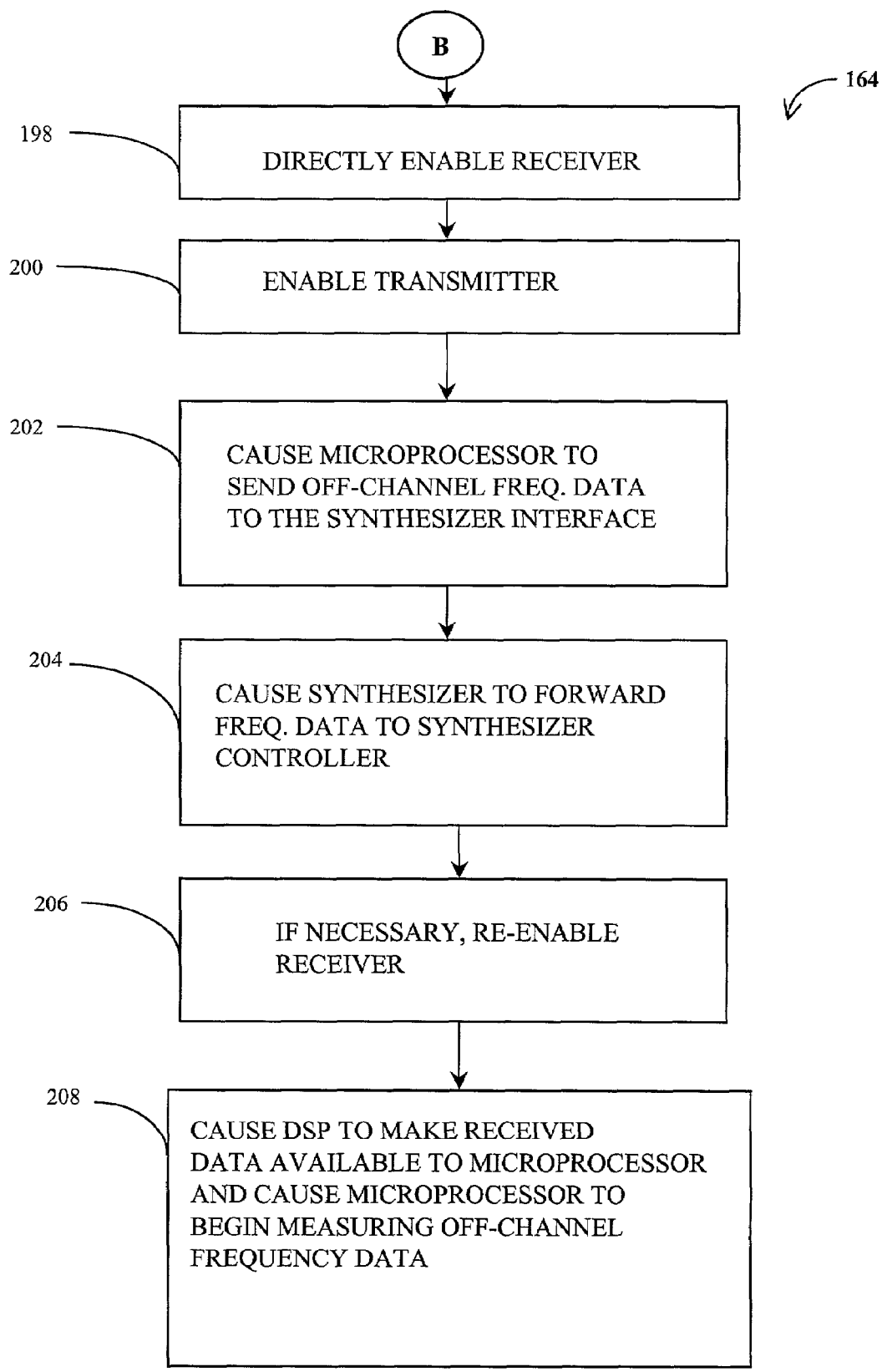
FIG. 15 is a flow chart illustrating a second method of system timer operation associated with a Steady State mode.

Referring also to FIG. 15 which aligns with FIG. 13 at connecting point B, the sequencer 60, when configured for a GSM communication system and when operating in the Steady State mode, may perform tasks similar to the tasks performed by a sequencer 60 configured for a TIA-EIA-136 communication system with a few differences to account for the differences between the frame format associated with the GSM system and the frame format associated with the TIA-EIA-136 communication system. For example, in a TIA-EIA-136 communication frame, the handoff slot 32 occurs after the receive slot 28 and before the transmit slot 30. In contrast, in a GSM communication frame the handoff 32 slot occurs after both of the receive and transmit slots 28, 30. In addition, the timing requirements are tighter in a GSM communication system than in a TIA-EIA-136 communication system. At the start of a frame in the Steady State mode for a GSM communication system, the sequencer 60 may generate a control signal to enable the receiver and the memory associated with the receiver so that data may be received at the communication device 12 (step 198). To meet the tighter timing requirements associated with the GSM communication-system, the sequencer 60 may control the receiver directly in response to an RXENA instruction 132 instead of indirectly controlling the receiver using a DSP_INT instruction 120 as was used to enable the receiver in the during the steady state mode program 164 in the TIA-EIA-136 communication system. After the RXENA instruction 132 has been executed and when the transmit slot begins, the sequencer 60 may enable the transmitter for a length of time equal to the length of the transmit slot via the execution of a TXSTART instruction (step 200). After the transmit slot and at the start of the handoff slot, the sequencer 60 may enable the receipt and measurement of off-channel signals. Specifically, the sequencer 60 may interrupt the microprocessor 34 causing the microprocessor 34 to supply off-channel frequency data to the synthesizer interface 46 (step 202) and may further cause the synthesizer interface 46 to forward the off-channel frequency data to the synthesizer controller 44 (step 204). The interrupt signal may be generated, for example, in response to an ARMINT instruction 122 and the off-channel frequency data may be supplied to the synthesizer controller 44 via the SYNSEND instruction 126. Provided that the receiver is still enabled, the sequencer 60 need not re-enable the receiver associated with the hardware devices 40 to receive the off-channel data. If instead the receiver has been disabled, then the sequencer 60 may again use an RXENA instruction 132 to enable the receiver (step 206). In addition, the sequencer 60 causes the microprocessor 34 to begin measuring the off-channel frequency data being received at the receiver (step 208) via, for example, an ARMINT instruction 122. If necessary, the sequencer 60 may also executing a DSPINT instruction 120 having a type field that indicates a frame interrupt 148 thereby causing the DSP 36 to make data received at the receiver available to the microprocessor 34 (step 208). Of course, as will be understood by one having ordinary skill in the art, while operating in the Steady State mode, the sequencer 60 may also cause a set of system timer outputs to change state as necessary to control the RF hardware devices 40 to enable the reception and transmission of data during the receive and transmit slots, respectively.

Figure 16:
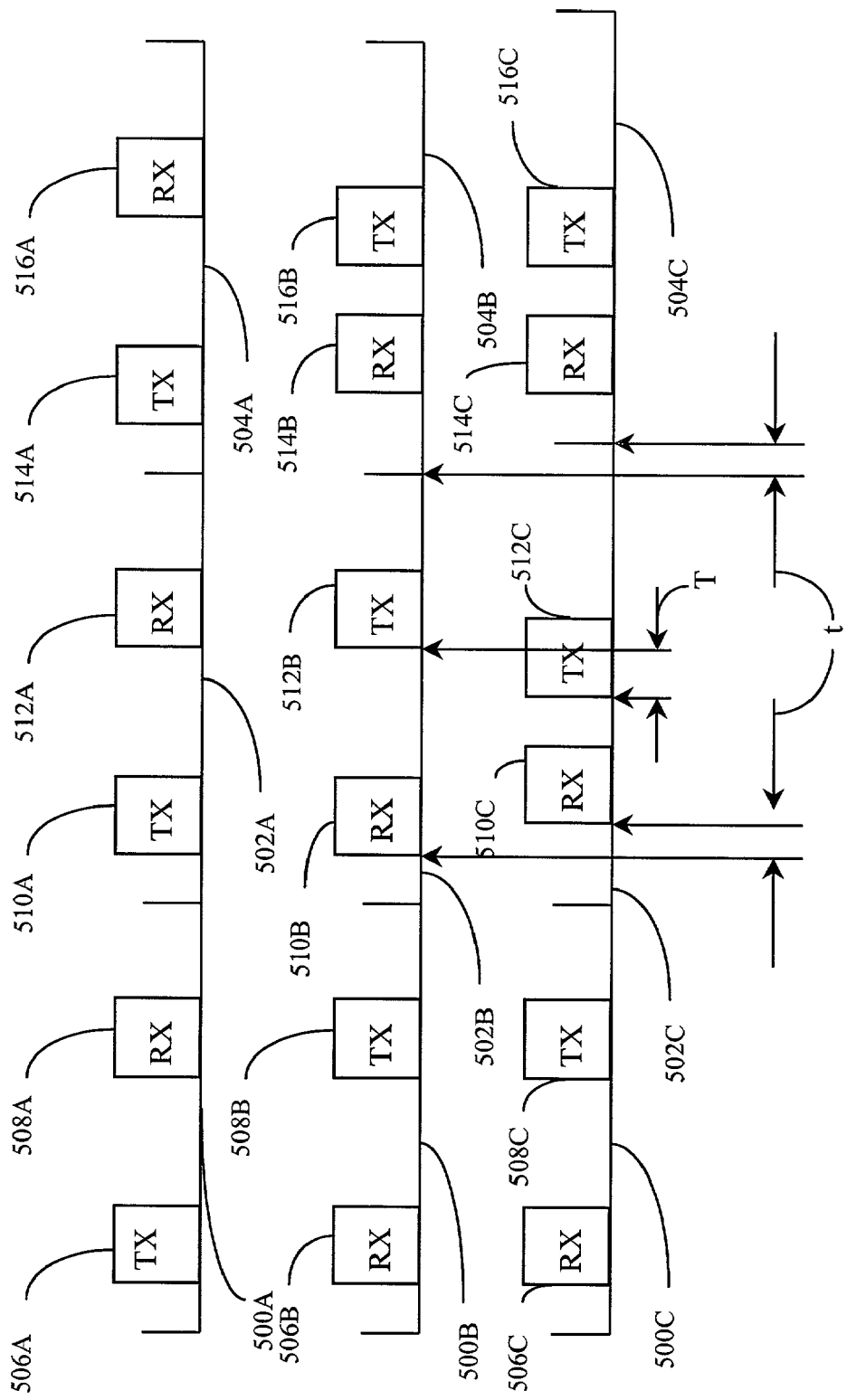
FIG. 16 is a diagram of a set of data frames having different timing characteristics.

Referring now to FIG. 16, the timebase adjust register 70 and timing adjust register 74 contain values that allow the timing of the receive 28 and transmit slots 30 associated with each frame 26 to be adjusted to account for movement of the communication device 12 relative to the base station 10. Movement of the communication device 12 relative to the base station 10 changes the distance between the communication device 12 and the base station 10 which affects the timing of communication between the communication device 12 and the base station 10. For illustrative purposes, the effect that a change in distance has on the timing of communication between the communication device 12 and the base station 10 is described with reference to the timing associated with the transmission and reception of three data frames 500, 502, 504 between the communication device 12 and the base station 10. Specifically, a set of frames 500A, 502A and 504A represent the timing at which the base station 10 is configured to transmit and receive data during each frame 500, 502, 504. As is conventional, the timing associated with the base station 10 is fixed such that a transmit slot occurs at a fixed time during each frame and a receive slot occurs at a fixed time during each frame. In addition, all of the frames 500A, 502A, 504A are equally long.

A set of frames 500B, 502B, 504B represent the timing at which the communication device 12 is configured to transmit and receive data during each of the frames 500, 502, 504, respectively. A set of frames 500C, 502C, 504C represent the timing at which the communication device 12 must actually transmit and receive data during each frame 500, 502, 504 to ensure that communication between the base station 10 and the communication device 12 is enabled. During the first frame 500, the communication device 12 is located very near to the base station 10 and during the second and third frames the communication device 12 has moved an unspecified distance away from the base station.

During the first frame 500, the communication device 12 is configured to receive data at the same time that the base station 10 transmits data and the communication device 12 is further configured to transmit data at the same time that the base station 10 receives data. Thus, a receive slot 506B at the communication device 12 is aligned with a transmit slot 506A at the base station 10 and a transmit slot 508B at the communication device 12 is aligned with a receive slot 508A at the base station. Moreover, because the communication device 12 is located very near to the base station 10 such that there is a very short distance separating the communication device 12 and the base station 10, the data travels between the communication device 12 and the base station 10 without delay. As a result, the times at which the communication device 12 must actually transmit 508C and receive 506C data to ensure proper communication with the base station 10 are aligned with the times at which the communication device 12 is configured to transmit 508B and receive 506B data such that proper communication is enabled.

As with respect to the first frame 500, during the second frame 502, the communication device 12 is configured to receive data at the same time that the base station 10 transmits data and the communication device 12 is further configured to transmit data at the same time that the base station 10 receives data. Thus, a receive slot 510B at the communication device 12 is aligned with a transmit slot 512A at the base station 10 and a transmit slot 512B at the communication device 12 is aligned with a receive slot 512A at the base station 10. However, during the second frame 502, the communication device 12 has moved an unspecified distance away from the base station 10 such that data transmitted by the base station 10 arrives at the communication device 12 after a delay "t" and data transmitted by the communication device 12 to the base station 10 arrives at the mobile device after a delay "T." Thus, to ensure proper communication, the communication device 12 should have been configured to receive data at a receive slot 510C occurring later than the receive slot 510B to account for the delay caused by the unspecified distance. Similarly, the communication device 12 further should have been configured to transmit data at a transmit slot 512C that is offset from the transmit slot 512B by the amount of time "T" wherein "T" is sufficient to compensate for the additional time required for the data to travel from the communication device 12 to the base station 10. As a result, the times at which the communication device 12 must actually transmit 512C and receive 510C data to ensure proper communication with the base station 10 are not aligned with the times at which the communication device 12 is configured to transmit 510B and receive 512B data thereby indicating that the times at which the communication device 12 is configured to transmit 512B and receive 510B data must be adjusted to prevent communication between the communication device 12 and the base station 10 from being impaired.

Specifically, unless the receive slot 510B associated with the communication device 12 is adjusted, at least some of the information transmitted by the base station 10 will not be received at the communication device 12, and unless the transmit slot 512B associated with the communication device 12 is adjusted, at least some of the information transmitted by the communication device 12 will not be received at the base station 10.

Figure 17:
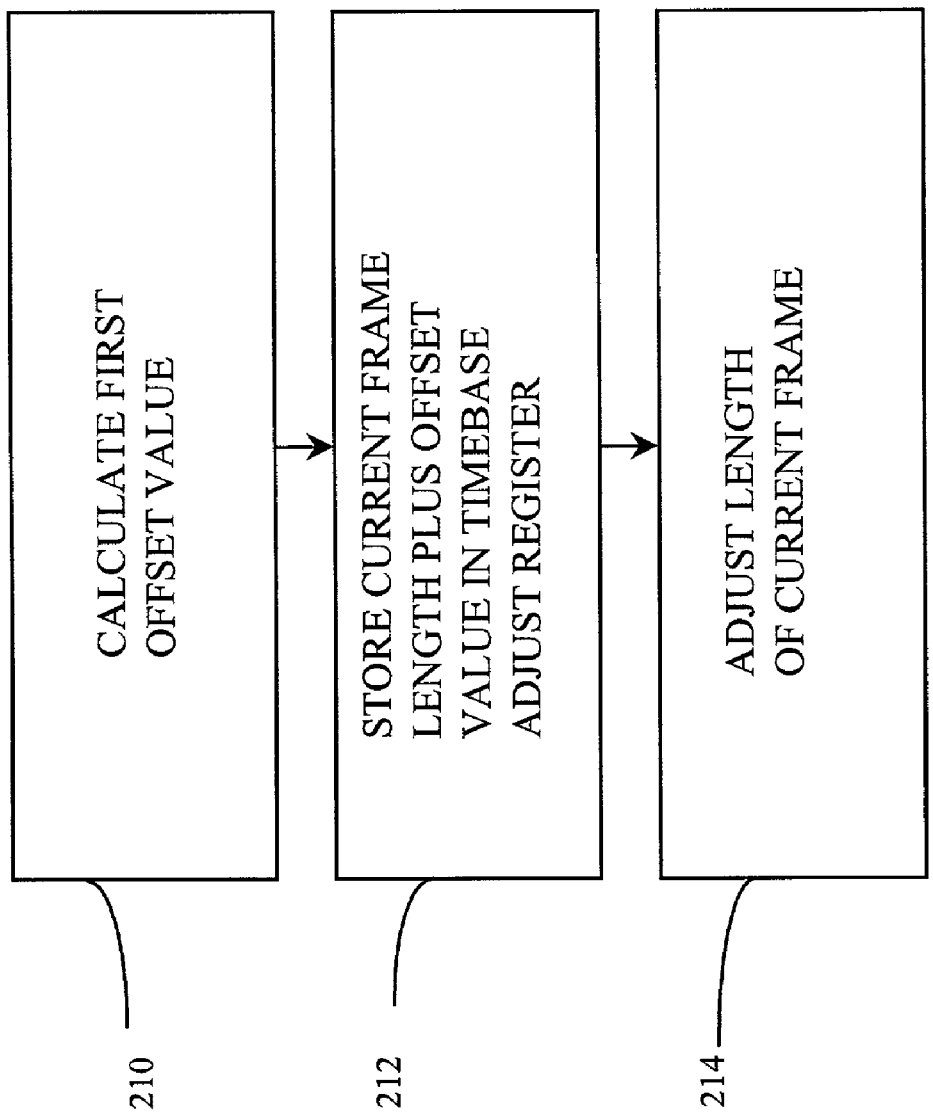
FIG. 17 is a flow chart illustrating a method for adjusting the length of a frame to change the time at which a receive slot begins.

Referring also to FIG. 17, a method 209 for adjusting the time at which the receive slot occurs in a given frame may be implemented using the sequencer 60, the microprocessor 34 and a set of software instructions and may begin, for example, when the microprocessor 34 calculates a first offset value, denoted FIRST OFFSET, equal to an amount of time by which the receive slot 510B at the communication device 12 should be offset during the next frame 504B, to enable reception of the complete set of data transmitted by the base station 10 during the next frame 504B (step 210). Thus, for example, if the sequencer 60 enabled the receiver at the start of the receive slot 510B but the microprocessor 34 did not detect received data until a period of time, "t," had elapsed after the start of the receive slot 510B, then the microprocessor 34 causes the FIRST OFFSET value to be equal to the time "t." Next, the microprocessor 34 causes a period of time equal to the current frame length plus the value of FIRST OFFSET to be stored in the timebase adjust register 70 (step 212). The sequencer 60 may then detect the presence of the newly stored value in the timebase adjust register 70 and adjust the current frame length by causing the timebase counter 64 to wrap to zero when the value in the timebase counter 64 is equal to the newly stored value located in the timebase adjust register 70. Thus, the point at which the timebase counter 64 wraps to zero is adjustable by storing a new frame length in the timebase adjust register 70. Lengthening the current frame 502B by an amount of time, t, causes the start of the subsequent frame 504B to occur later by an amount of time equal to t, thereby causing the start of the receive slot 514B to occur later by an amount of time equal to t during the next frame 504B. More particularly, the receive slot 510B occurs at a fixed time relative to the start of the frame 502B such that the time at which the receive slot 514B occurs in the frame 504B may be adjusted by changing the length of the frame 502B. If the communication device 12 is moving nearer to the base station 10 instead of farther away, then the microprocessor 34 stores a value in the timebase adjust register 70 that shortens the length of the current frame, 502B, thereby causing the start of the next frame, 504B, to occur earlier and thus causing the start of the receive slot 514B associated with the next frame 504B to begin earlier.

Figure 18:
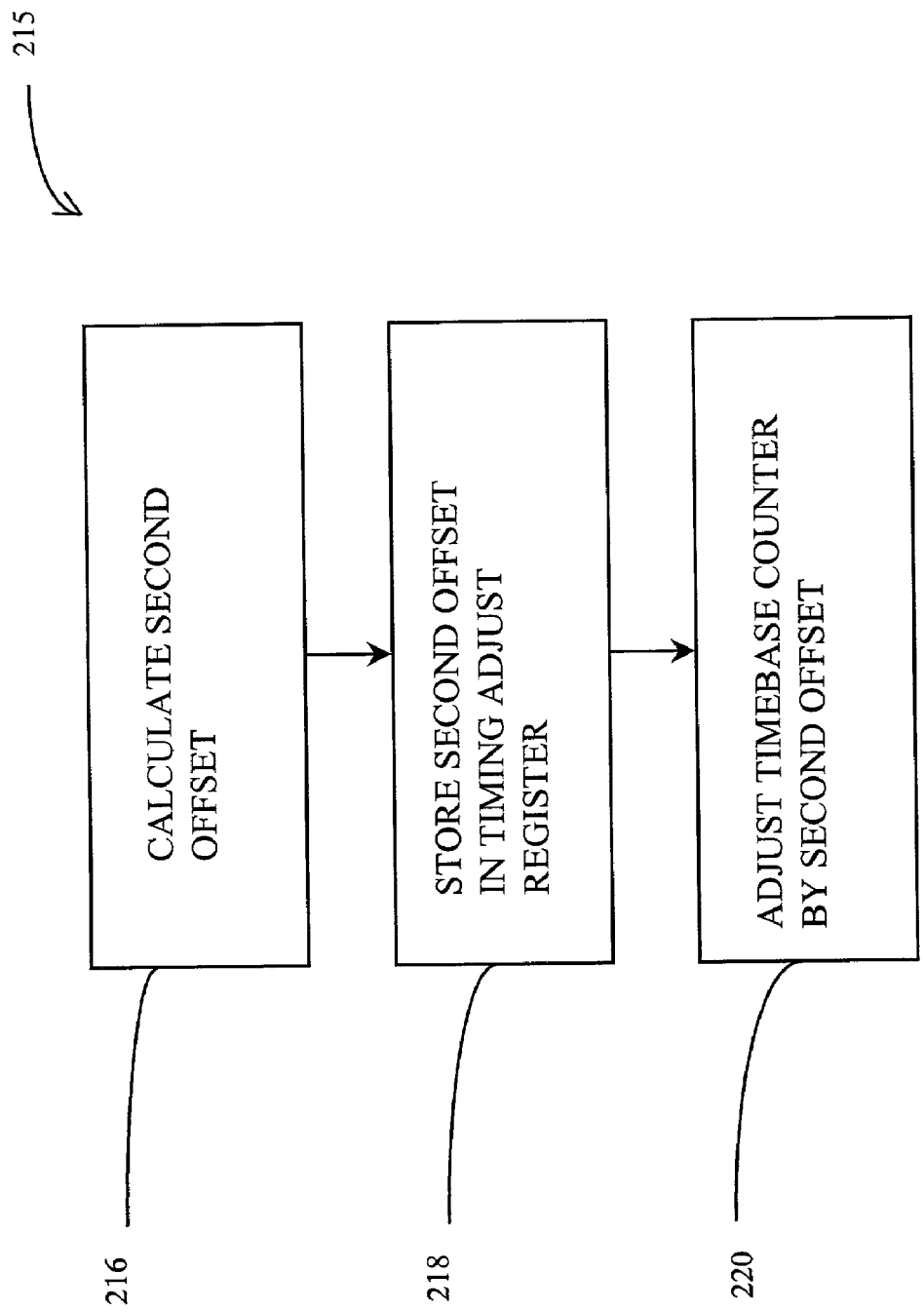
FIG. 18 is a flow chart illustrating a method for adjusting the timebase counter to change the time at which a transmit slot begins.

Referring also to FIG. 18, a method 215 for adjusting the time at which the transmit slot occurs in a given frame may be implemented using the sequencer 60, the microprocessor 34 and a set of software instructions and may begin, for example, when the microprocessor 34 calculates a second offset value, denoted SECOND OFFSET, equal to an amount of time, T, by which the transmit slot should be either delayed or advanced within the next frame, 504B. Conventionally, the time at which the transmit slot 512B occurs is fixed relative to the time at which the receive slot 510B occurs, i.e., the amount of time between the receive slot 510B and the transmit slot 512B is the same during each frame 500 502, 504. If the length of the previous frame 502B has been adjusted by an amount of time t, then the receive slot 514B will be delayed by an amount of time t. However, as described above, as the distance separating the communication device 12 from the base station 10 increases, as has occurred in frame 502B, the transmit slot 512B must occur earlier so that information transmitted by the communication device 12 has sufficient time to reach the base station 10 at the start of the receive slot 512A. Thus, the method 215 may begin when the microprocessor 34 calculates the value of SECOND OFFSET by determining the amount of time by which the transmit slot 512B was either too late or too early relative to the frame 502 (step 216). Next, the microprocessor 34 causes a value equal to SECOND OFFSET to be stored in the timing adjust register 74 (step 218). The sequencer 60 may then adjust the value stored in the timebase counter 64 by an amount of time equal to SECOND OFFSET thereby causing the transmit slot to be advanced or delayed by an amount of time equal to SECOND OFFSET (step 220). The sequencer 60 may adjust the value stored in the timebase counter 64 by, for example, executing the "TBADJSN d" instruction 142. As described above, the sequencer 60 causes the value in the timebase counter 64 to be advanced by an amount of time equal to the value stored in the timing adjust register if "d" is equal to one (1) thereby causing the transmit slot to begin earlier and the sequencer 60 causes the value in the timebase counter 64 to be delayed by an amount of time equal to the value stored in the timing adjust register if "d" is equal to zero (0) thereby causing the transmit slot to start later. The microprocessor 34 may cause the sequencer 60 to execute the TBADJSN instruction 142 by storing the address of the TBADJSN instruction 142 in the command register 82 or the TBADJSN instruction 142 may instead be stored at a location in the sequencer RAM 62 that ensures that the TBADJSN instruction 142 is executed once during every frame 500, 502, 504. Of course, if no adjustment to the timing of the transmit slot 512B is required for the frame 502B, the microprocessor 34 may store a value of zero (0) in the timing adjust register 74 so that the timebase counter 64 is neither advanced nor delayed by the execution of the TBADJSN instruction 142 during the next frame 504B. Further, the TBADJSN instruction 142 must be executed after the receive slot 514B has ended so that the TBADJSN instruction 142 does not affect the time at which the receive slot 514B occurs within the frame 504B. As will be appreciated by one having ordinary skill in the art, the execution of the TBADJSN instruction 142 will affect the overall length of the frame for which the TBADJSN instruction 142 is executed. Thus, when calculating the value of the FIRST OFFSET to be stored in the timebase adjust register 70 for adjusting the length of the next frame, the microprocessor 34 may account for the amount of time by which the timebase counter 64 was either incremented or delayed during the current frame, i.e., SECOND OFFSET. Likewise, when calculating the value of the SECOND OFFSET for a current frame, the microprocessor 34 may account for the amount of time, i.e., FIRST OFFSET, by which the frame was lengthened or shortened during the previous frame.

Figure 19:
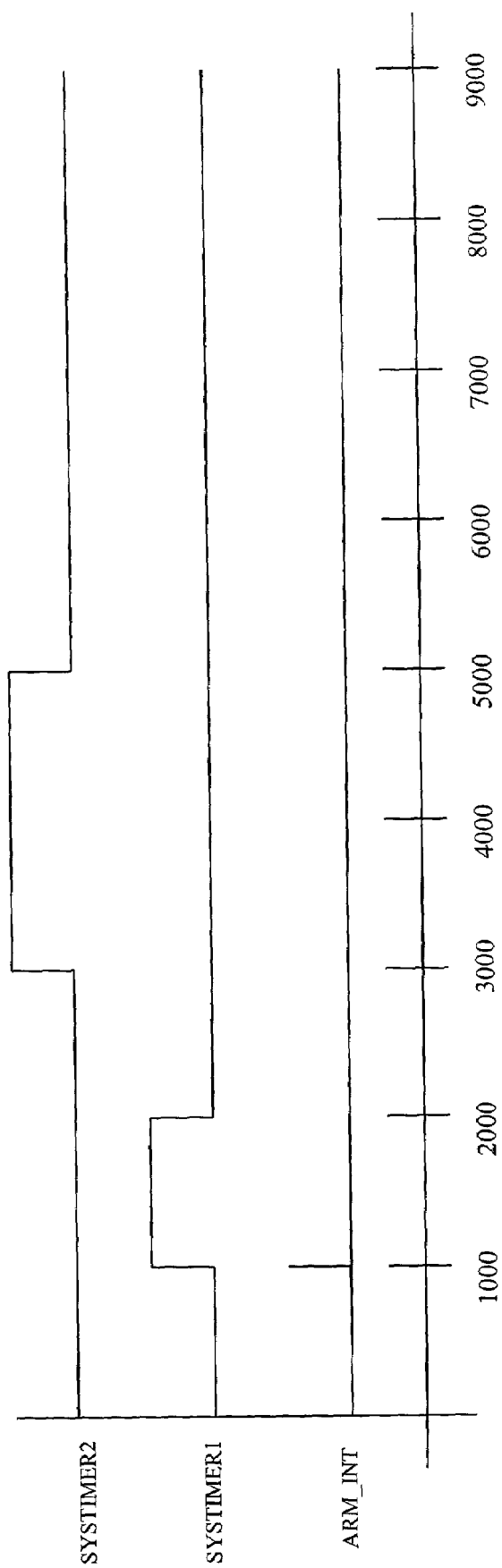
FIG. 19 is a set of waveforms that may be generated by the system timer.
Figure 20:
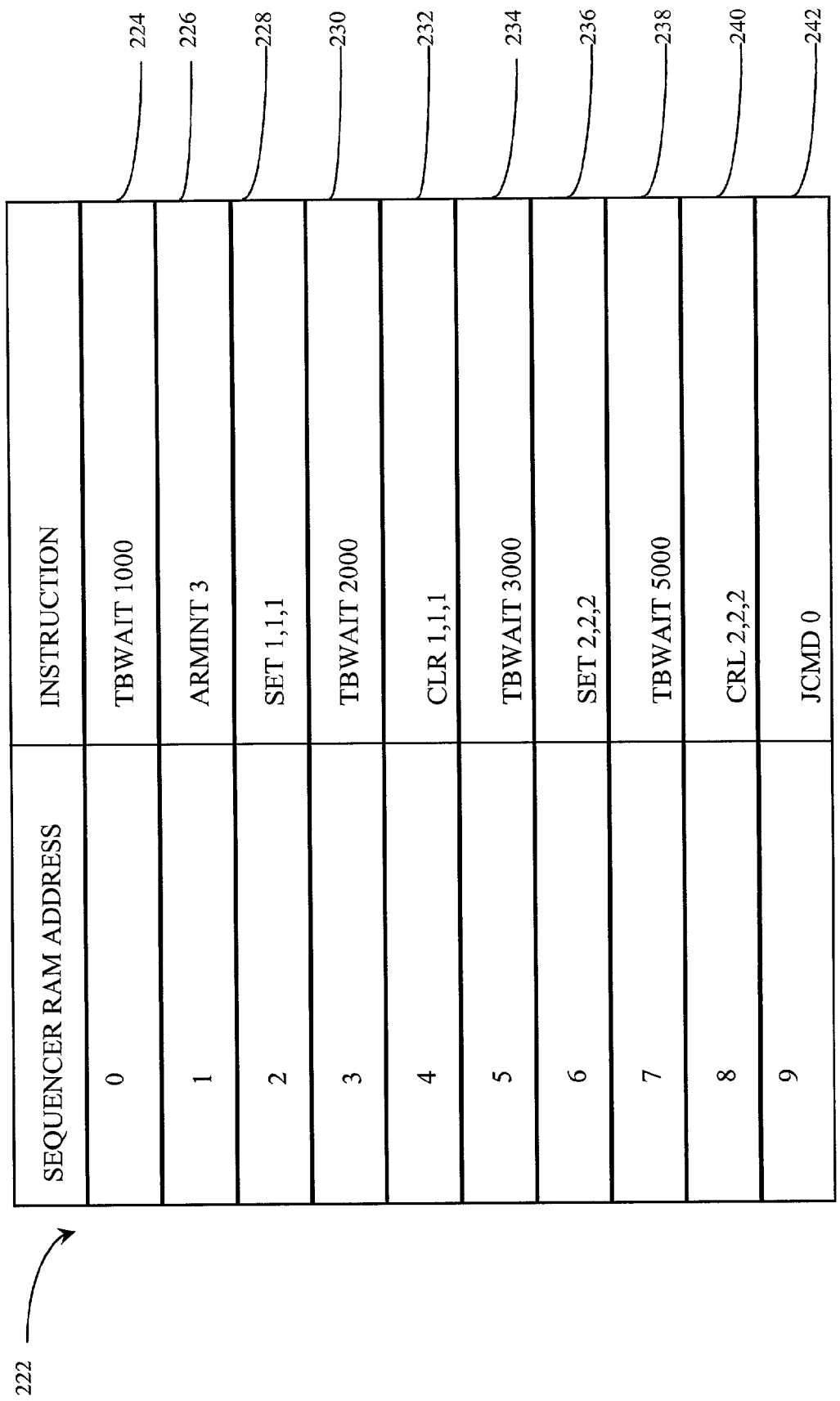
FIG. 20 is a table of software instructions that may be used to program the system timer to generate the waveforms of FIG. 19.

Referring now to FIG. 19, to illustrate the versatility of the system timer 50, a variety of methods that may be used to cause the sequencer 60 to generate a set of system timer output waveforms referred to as SYSTIMER1, SYSTIMER2 and ARM_INT are described. The output waveform SYSTIMER1 may represent an RXWIN interrupt 150 signal such that when SYSTIMER1 is at a logic level high, the sequencer 60 supplies an RXWIN interrupt signal 150 to the DSP 36. In addition, the output waveform SYSTIMER2 may represent a TXWIN interrupt 152 signal such that when SYSTIMER2 is at a logic level high, the sequencer 60 supplies a TXWIN interrupt 152 signal to the DSP 36. The ARM_INT 122 signal represents an interrupt signal supplied by the sequencer 60 to the microprocessor 34 for any desired purpose, such as, for example, to inform the microprocessor 34 as to when an event shall occur. Referring also to FIG. 20, in a first method, a series of instructions 222 may be stored in the sequencer RAM 62 and executed by the sequencer 60 beginning with a TBWAIT 1000 instruction 224 that causes the sequencer 60 to wait until the timebase counter 64 is equal to a value of 1000. The next sequential RAM address may include an ARMINT 3 instruction 226 causing the sequencer 60 to send an interrupt signal to the microprocessor 34 and to further cause a type three interrupt to be indicated by the bits stored in the IS_SEQTYPE field of the ARM Interrupt Status Register. A type three interrupt may be defined to represent any desired type of interrupt. A SET 1,1,1 instruction 228 may follow the ARMINT 3 instruction thereby causing the sequencer 60 to generate a logic level high on the SYSTIMER1 output which, as described above, causes an RXWIN interrupt signal 150 to be sent to the DSP 36. The sequencer RAM 62 may then include a TBWAIT 2000 instruction 230 causing the sequencer 60 to wait until the timebase counter 64 is equal to 2000 before executing the next instruction stored in the sequencer RAM 62 which may comprise a CLR 1,1,1 instruction 232. The CLR 1,1,1 instruction 232 causes the sequencer 60 to set the SYSTIMER1 output equal to a logic level low thereby disabling the receiver. After the CLR 1,1,1 instruction 232, the sequencer RAM 62 may include a TBWAIT 3000 instruction 234 causing the sequencer 60 to wait until the timebase counter 64 is equal to 3000 before executing the instruction located at the next sequential sequencer RAM address. The instruction located at the next sequential sequencer RAM 62 address may include a SET 2,2,2 instruction 236 which causes the sequencer 60 to place a logic level high on the SYSTIMER2 output thereby causing a TXWIN interrupt signal 152 to be sent to the DSP 36. A TBWAIT 5000 instruction 238 then causes the SYSTIMER2 output signal to remain high until the timebase counter 64 is equal to a value of 5000. After the timebase counter 64 reaches 5000, a CLR 2,2,2 instruction 240 causes the sequencer 60 to set the SYSTIMER2 output to a logic level zero causing the TXWIN interrupt signal 152 to be set at a logic level low so that the transmitter is disabled. After the CLR 2,2,2 instruction 240, the sequencer RAM 62 may include a JCMD 0 instruction 242 that causes the sequencer 60 to jump to the address stored in the command register 82 provided that the command register 82 is not empty. If the command register 82 is empty, the sequencer 60 returns to the first address, i.e., address 0, located in the sequencer RAM 62.

Referring now to FIG. 21, an alternative set of instructions 244 may also be used to generate the waveforms shown in FIG. 19, depending on the setting of the MODE bits, A', B', C', D' stored in the control register 76 and the status of the TX_ENA bit. Specifically, the set of instructions 244 include a set of strategically placed conditional JMP instructions 114 that may affect the sequence of the instructions executed by the sequencer 60. For purposes of describing the operation of the sequencer 60 when executing the instructions of FIG. 21, the mode bits A', B', C' and D' stored in the control register 76 are assumed to be set to 1101 and the TX_ENA bit is assumed to be set to a logic level high (1). As described above, the setting of each of the bits A, B, C, and D are defined in the "ABCD" field of the JMP instruction 114. The set of instructions 244 begin with a conditional jump instruction 246 that causes the sequencer 60 to either jump to the sixth address stored in the sequencer RAM 62 (if "RESULT" is equal to zero) or to continue to the next consecutive instruction stored in the sequencer RAM 62. Based on the setting of the MODE bits, A', B', C' and D', the "ABCD" field and the setting of the TX_ENA bit, the conditional jump instruction 246 at the address zero in the sequencer RAM 62 causes RESULT to be equal to a logic level high (1) such that the sequencer 60 continues at the next consecutive instruction stored in the sequencer RAM 62. The next five instructions 248, 250, 252, 254, 256 stored at sequencer RAM addresses one through five are identical to the instructions 224, 226, 228, 230, 232 stored in the sequencer RAM 62 addresses 0 through 4 of FIG. 20 and, as a result, will cause the sequencer 60 to respond in the manner described above for the respective instructions. Thus, the sequencer 60 waits until the value stored in the timebase counter 64 is equal to 1000, generates a microprocessor interrupt signal, sets the SYSTIMER1 output to a logic level high, waits until the value stored in the timebase counter 64 is equal to 2000 and then clears the SYSTIMER1 output by setting the SYSTIMER1 output equal to a logic level zero (0). After the instructions stored at sequencer RAM 62 addresses one through five are executed, the sequencer 60 executes the conditional jump instruction stored at sequencer RAM 62 address six. The conditional jump instruction 258 at address six in the sequencer RAM 62 causes RESULT to be equal to a logic level high (1) so that the sequencer 60 executes the next four consecutive instructions 260, 262, 264, 266 stored in the sequencer RAM 62, i.e., sequencer RAM 62 addresses seven through ten. The instructions 260, 262, 264, 266 stored at sequencer RAM 62 addresses seven through ten are identical to the instructions 234, 236, 238, 240 shown in FIG. 20 as being stored at sequencer RAM 62 addresses five through eight. Thus, the instructions 260, 262, 264, 266 stored at sequencer RAM 62 addresses seven through ten cause the sequencer 60 to perform the same tasks as described above for the corresponding instructions of FIG. 20. Specifically, the sequencer 60 waits until the value stored in the timebase counter 64 is equal to 3000, sets the SYSTIMER2 output equal to a logic level high, waits until the value stored in the timebase counter 64 is equal to 5000 and then clears the SYSTIMER2 output. After executing the instructions stored at sequencer RAM 62 addresses seven through ten, the sequencer 60 encounters a conditional jump instruction 268 at the next, consecutive sequencer RAM address eleven. The conditional jump instruction 268 causes RESULT to be equal to a logic level zero such that the sequencer 60 jumps to the instruction 278 stored at sequencer RAM address sixteen thereby skipping over, i.e., not executing, the instructions 270, 272, 274, 276 stored at the sequencer RAM addresses twelve through fifteen. At sequencer RAM 62 address sixteen, the sequencer 60 encounters another conditional jump instruction 278. The conditional jump instruction 278 stored at sequencer RAM address sixteen causes RESULT to be equal to zero so that the sequencer 60 jumps to the sequencer RAM 62 address specified in the address field of the conditional jump instruction 278, i.e., sequencer RAM 62 address twenty one, thereby skipping the instructions 280, 282, 284, 286 stored in the sequencer RAM 62 addresses seventeen through twenty. The instruction 288 stored in sequencer RAM address twenty one, i.e., JCMD 0, causes the sequencer 60 to either jump to sequencer RAM address zero or to the address stored in the command register 82, depending on whether the command register 82 is empty. Thus, the settings of the mode bits A', B', C' and D' and the setting of the TX_ENA bit cause the sequencer 60 to skip the instructions stored in the sequencer RAM 62 at the addresses twelve through fifteen and seventeen through twenty thereby allowing the waveforms shown in FIG. 19 to be generated. Of course, the microprocessor 34 may instead set the bits A', B', C' and D' in a manner that causes the sequencer 60 to execute the instructions stored at the addresses twelve through fifteen and seventeen through twenty thereby lending flexibility and versatility to the capabilities of the sequencer 60 and thus the communication device 12.

Referring now to FIG. 22, alternatively, the waveforms of FIG. 19 may also be generated under the control of the microprocessor 34 using the conditional jump capabilities provided by the JCMD instruction 112. More particularly, the instructions described with respect to FIG. 20 may be populated with strategically placed JCMD instructions 112 that allow the microprocessor 34 to control the sequence at which the instructions are executed. Further, the microprocessor 34 may store the following set of sequencer RAM addresses in the command register 82: one, six, eight, eleven and thirteen. As described above, the microprocessor 34 may write to the command register 82 at the beginning of each frame thereby preventing the need for the microprocessor 34 to continuously update the instructions stored in the sequencer RAM 62 as timing data becomes available from the base station 10. Thus, for example, a set of instructions 290 may be stored in the sequencer RAM 62 and may begin at an address zero with a JCMD 1 instruction 292 that causes the sequencer 60 to execute the instruction 294 stored at sequencer RAM address one. Note that, as described above, the JCMD instruction 112 causes the sequencer 60 to jump to an address stored in the command register 82, unless the command register 82 is empty in which case the sequencer 60 instead jumps to the address specified in the address field of the JCMD instruction 112. In this instance, the address stored in the command register 82 and the address specified in the JCMD instruction 292 are identical thereby causing the JCMD instruction 292 to operate as an unconditional jump. Thus, the sequencer 60 proceeds to execute the instructions stored at sequencer RAM address one and, subsequently, the instructions stored at sequencer RAM addresses two through four. The instructions 294, 296, 298 stored in the sequencer RAM 62 address numbers one through three of FIG. 23 are identical to the instructions 224, 226, 228 stored at sequencer RAM addresses zero through two of FIG. 20, and thus, cause the sequencer 60 to perform an identical set of tasks, i.e., wait until the value stored in the timebase counter 64 is equal to 1000, supply a type-three interrupt to the microprocessor 34 and then set the SYSTIMER1 output to a logic level high. After setting the SYSTIMER1 output, the sequencer 60 executes an RTBWAIT 1000 instruction 300 stored at sequencer RAM address four. The RTBWAIT instruction 300 causes the sequencer 60 to wait for 1000 clock counts to elapse before executing the next, consecutive instruction 302. After 1000 clock counts have elapsed, the sequencer 60 encounters a JCMD 6 instruction 302 at sequencer RAM address five causing the sequencer 60 to execute the CLR 1,1,1 instruction 304 stored at sequencer RAM address six by setting the SYSTIMER1 output to a logic level low. After setting the SYSTIMER1 output low, the sequencer 60 executes a JCMD 8 instruction 306 stored at sequencer RAM address seven causing the sequencer 60 to jump to an instruction 308 stored at sequencer RAM address eight. At sequencer RAM address eight, the sequencer 60 executes a "TBADJSN 0" instruction 308 causing the sequencer 60 to decrement the value in the timebase counter 64 by the value stored in the timing adjust register 74. Assuming, for example, that the value stored in the timing adjust register 74 is equal to 1000, then the value in the timebase counter 64, which is currently equal to 2000, is decreased to a value of 1000. After decrementing the timebase counter 64, the sequencer 60 executes an RTBWVAIT 2000 instruction 310 stored at the sequencer RAM 62 address nine which causes the sequencer 60 to wait until 2000 clock counts have elapsed before executing a SET 2,2,2 instruction 312 causing the sequencer 60 to set the SYSTIMER2 output to a logic level high. Next, the sequencer 60 executes an RTBWAIT 1000 instruction 314 at sequencer RAM address eleven causing the sequencer 60 to wait for 1000 clock counts to elapse before executing a JCMD 13 instruction 310 stored at sequencer RAM address twelve. The sequencer 60 then executes the instruction stored at sequencer RAM address eleven causing the sequencer 60 to again wait for 1000 clock counts to elapse. During the 2000 clock counts that elapse while executing the RTBWAIT 1000 instruction 314 stored at the sequencer RAM 62 address number eleven twice consecutively, the SYSTIMER2 output is maintained at a logic level high. Thereafter, the sequencer 60 again encounters, the JCMD 13 instruction 316, this time causing the sequencer 60 to jump to sequencer RAM 62 address thirteen. At sequencer RAM address thirteen, the sequencer 60 is instructed to set the SYSTIMER2 output to a logic level low via a CLR 2,2,2 instruction 318. Next, the sequencer 60 executes the instruction 320 stored at sequencer RAM address fourteen causing the sequencer 60 to increment the value stored in the timebase counter 64 by the value stored in the timing adjust register 74, i.e., 1000, thereby causing the value stored in the timebase counter 64 to be equal to 6000. After the timebase counter 64 has been adjusted, the sequencer 60 executes a JCMD 0 instruction 322 causing the sequencer 60 to jump back to the sequencer RAM 62 address zero because the command register 82 is empty.

Figure 23A:
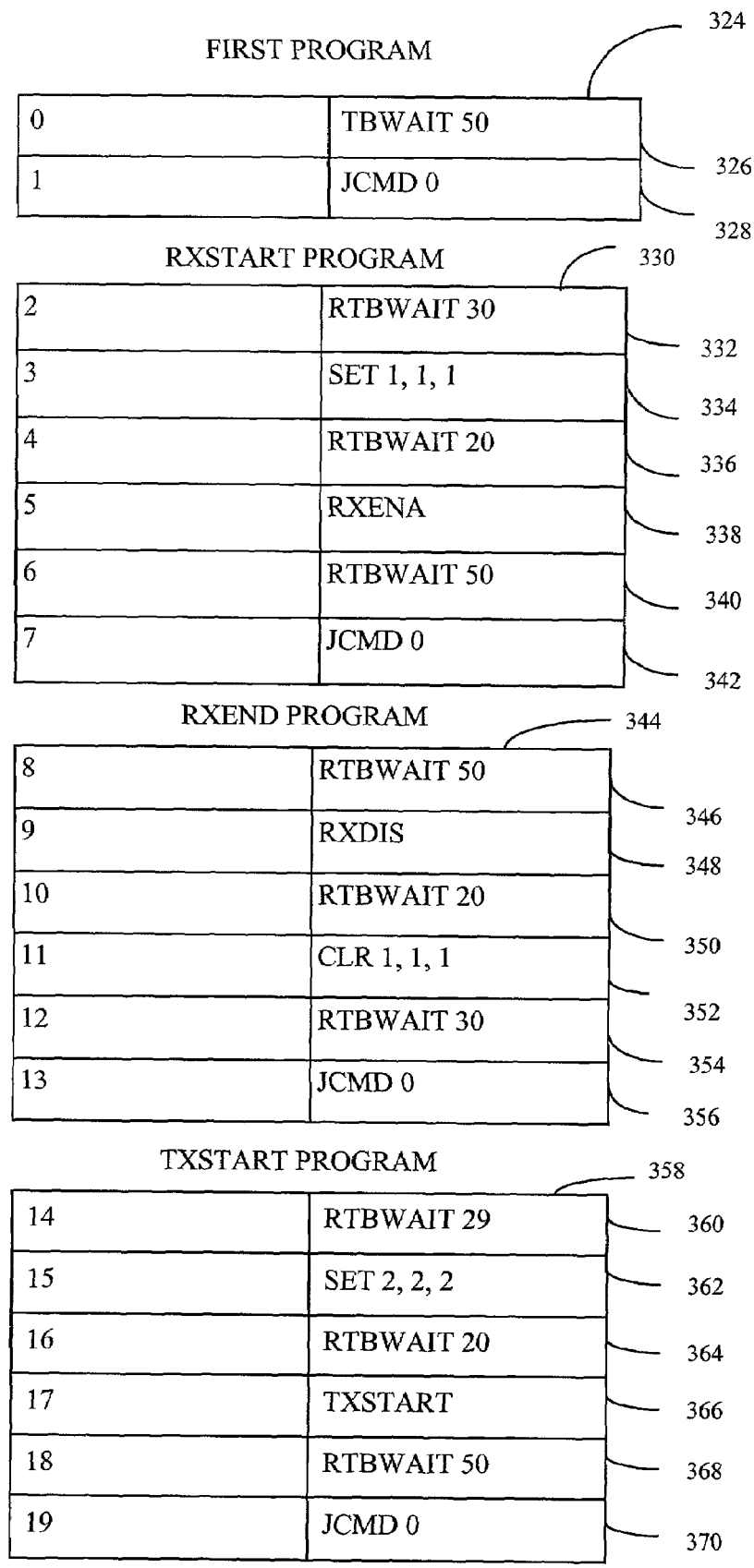
FIGS. 23A and 23B provide a set of generic program blocks that may be stored in the sequencer RAM and executed by the system timer under the control of the microprocessor of FIG. 4.
Figure 23B:
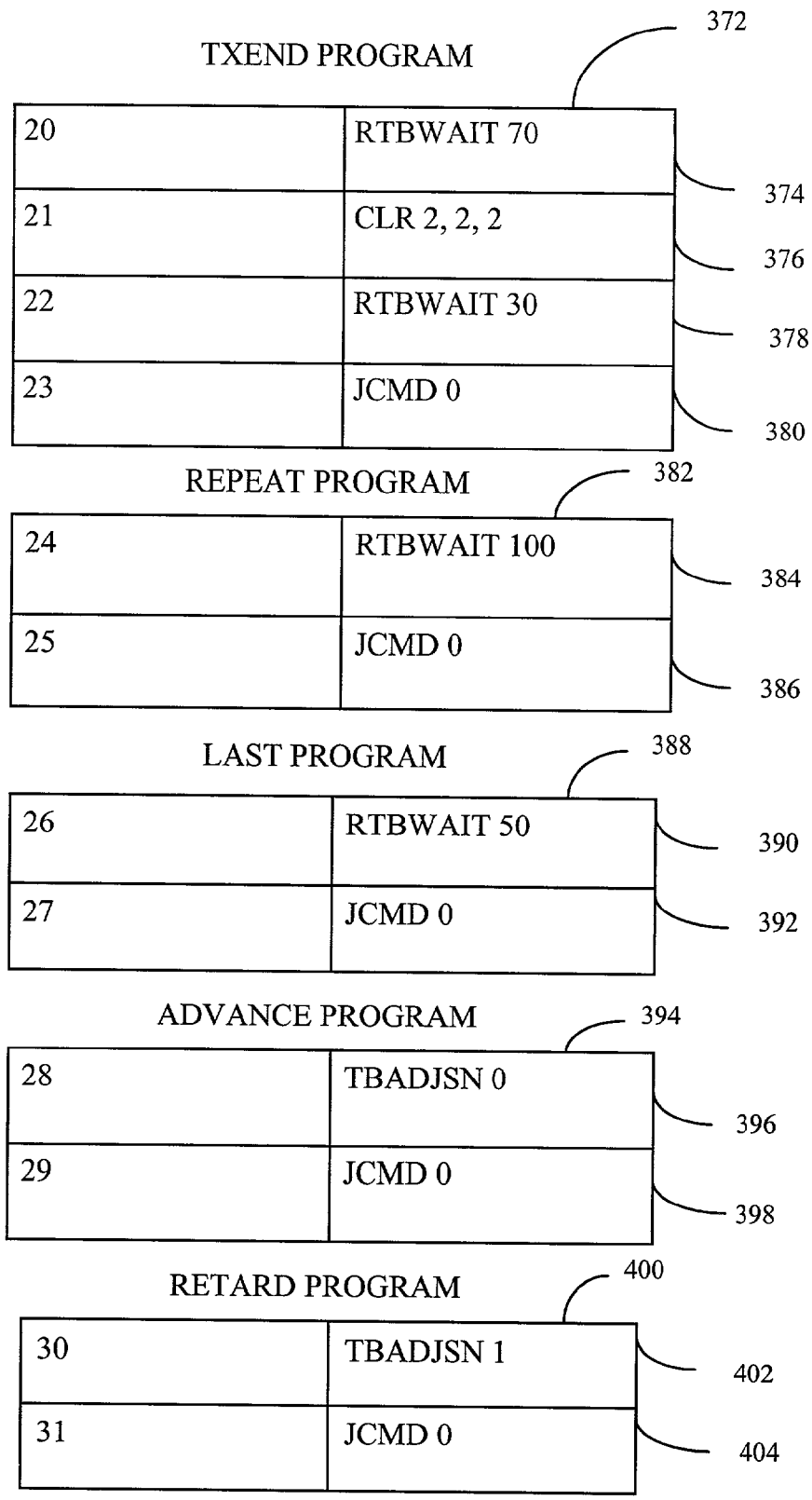

Referring now to FIGS. 23A and 23B, the system timer 50 may also be programmed to execute a set of generic program blocks having any desired set of instructions. Moreover, each generic program block may be stored at a specific memory location in the sequencer RAM 62 such that the microprocessor 34 may cause the sequencer 60 to execute a desired one of the generic program blocks by writing the starting address of the desired generic program block into the command register 82. As described above, the sequencer 60 will jump to the address stored in the command register 82 when the sequencer 60 executes a JCMD instruction 112 or when the microprocessor 34 causes the RESET bits 78 in the command register 82 to be set to a value of "001." Thus, the system timer 50 is not limited to generating only the waveforms that are defined according to the instructions stored in the sequencer RAM 62 but may instead generate waveforms having any desired pattern using generic program blocks. For illustrative purposes, a set of eight generic program blocks are described below. However, any number of instructions arranged in any desired order may be used to create any number of generic program blocks such that the eight generic program blocks described herein are intended to be exemplary only.

Referring specifically to FIG. 23A, a first of the generic program blocks 324, denoted "FIRST Program," provides time during which any steps necessary to set up the RF hardware devices 40 may be performed and may be implemented using a TBWAIT 50 instruction 326 that causes the system timer 50 to wait until the timebase counter 64 is equal to a value of fifty (50) and may further use a JCMD instruction 328 that causes the sequencer 60 to jump to the address stored in the command register 82 unless the command register 82 is empty in which case the sequencer 60 instead jumps to address zero in the sequencer RAM 62. As will be understood by one having ordinary skill in the art, the amount of time necessary to allow the system setup functions to occur may vary depending upon the RF hardware devices 40 installed in the communication device 12 and will typically be determined via testing of the RF hardware devices 40.

A second of the generic program blocks 330, denoted "RXSTART Program," may be used to enable the receiver and may include an RTBWAIT 30 instruction 332 that causes the system timer to wait for thirty clock counts to elapse and may further include a SET 1,1,1 instruction 334 that causes the system timer to set SYSTIMER1 output to a logic level high. The SYSTIMER1 output may be coupled to, for example, a portion of the RF hardware devices 40 that are associated with setting the receiver to a desired receive frequency. Alternatively, the SYSTIMER1 output may be coupled to any other portion of the RF hardware devices 40 that are associated with preparing the receiver for operation. Next, the RXSTART Program 330 may include an RTBWAIT 20 instruction 336 causing the sequencer 60 to wait for twenty clock counts to elapse followed by an RXENA instruction 338 causing the sequencer 60 to enable the receiver associated with the RF hardware devices 40. The RXSTART Program 330 may further include an RTBWAIT 50 instruction 340 causing the sequencer 60 to wait fifty clock counts from the current timebase value before executing a JCMD 0 instruction 342. As described above, the JCMD 0 instruction 342 causes the sequencer 60 to either jump to the address stored in the command register 82 or to the address specified in the address field of the JCMD instruction 342 depending on whether the command register 82 is empty.

A third of the generic program blocks 344, denoted "RXEND Program," may be used to disable the receiver and may include an RTBWAIT 50 instruction 346 that causes the sequencer 60 to wait for fifty clock counts to elapse before disabling the receiver using an RXDIS instruction 348. After the RXDIS instruction 348, the RXEND program 344 may include an RTBWAIT 20 instruction 350 causing the sequencer 60 to wait for twenty clock counts to elapse from the current value of the timebase counter 64 before executing a CLR 1,1,1 instruction 352 that causes the sequencer 60 to clear SYSTIMER1 output so that the receiver associated with the RF hardware devices 40 is disabled. After the CLR 1,1,1 instruction 352, the RXEND program 344 may include an RTBWAIT 30 instruction 354 causing the system timer to wait for thirty clock counts to elapse before executing a JCMD 0 instruction 356 that causes the sequencer 60 to either jump to an address in the command register 82 or to the next address stored in the sequencer RAM 62, depending on whether the command register 82 is empty.

A fourth of the generic program blocks 358, denoted "TXSTART Program," may be used to enable the transmitter and may include an RTBWAIT 29 instruction 360 that causes the sequencer 60 to wait for twenty nine clock counts to elapse before setting a SYSTIMER2 output using a SET 2,2,2 instruction 362. The SYSTIMER2 output may be used to control any of a portion of the RF hardware devices 40 that are used to prepare the transmitter for operation. After the SET 2,2,2 instruction 362, the TXSTART program 358 may include an RTBWAIT 20 instruction 364 that causes the sequencer 60 to wait for twenty clock counts to elapse before executing a TXSTART instruction 366 that causes the sequencer 60 to enable the transmitter. After executing the TXSTART instruction 366, the sequencer 60 may encounter an RTBWAIT 50 instruction 368 causing the sequencer 60 to wait for fifty counts to elapse before executing a JCMD 0 instruction 370 that causes the sequencer 60 to either jump to an address in the command register 82 or to an address specified in the address field of the JCMD instruction, depending on whether the command register 82 is empty.

Referring specifically to FIG. 23B, a fifth of the generic program blocks 372, denoted "TXEND Program," may be used to disable the transmitter and may include an RTBWAIT 70 instruction 374 that causes the sequencer 60 to wait for seventy clock counts to elapse before clearing the SYSTIMER2 output using a CLR 2,2,2 instruction 376. After the CLR 2,2,2 instruction 376, the TXEND Program 372 may include an RTBWAIT 30 instruction 378 that causes the sequencer 60 to wait for thirty clock counts to elapse before executing a JCMD 0 instruction 380 that causes the sequencer 60 to either jump to an address in the command register 82 or to the address specified in an address field of the JCMD instruction, depending on whether the command register 82 is empty.

A sixth of the generic program blocks 382, denoted "REPEAT Program," may be used to pause the operation of the sequencer 60 for a desired length of time by including an RTBWAIT 100 1nstruction 384 that causes the sequencer 60 to wait for 100 clock counts to elapse before executing a JCMD 0 instruction 386 that causes the sequencer 60 to either jump to an address stored in the command register 82 or to an address specified in the address field of the JCMD instruction 386, depending on whether the command register 82 is empty.

A seventh of the generic program blocks 388, denoted "LAST Program," may be used to pause the operation of the sequencer 60 between the end of the TXEND Program 372 and the beginning of the next frame by including an RTBWAIT 50 instruction 390 that causes the sequencer 60 to wait for fifty clock counts to elapse before executing a JCMD 0 instruction 392 that causes the sequencer 60 to either jump to an address stored in the command register 82 or to an address specified in the address field of the JCMD instruction 392, depending on whether the command register 82 is empty. Preferably, the amount of time that the sequencer 60 waits due to the RTBWAIT instruction 390 is sufficient to reach the end of the frame.

An eighth of the generic program blocks 394, denoted "ADVANCE Program," may be used to advance the timebase counter 64 by including a TBADJSN 0 instruction 396 that causes the sequencer 60 to decrement the timebase counter 64 by an amount of time equal to the value stored in the timing adjust register 74. After the TBADJSN instruction 396, the ADVANCE Program 394 may include a JCMD 0 instruction 397 that causes the sequencer 60 to jump to an address stored in the command register 82 or to the next address stored in the sequencer RAM 62, depending on whether the command register 82 is empty. A ninth of the generic program blocks 400, referred to as "RETARD Program" may be used to retard the timebase counter 64 and may be identical to the ADVANCE Program 394 except that a TBADJSN instruction 402 included in the RETARD Program 394 will be formatted as "TBADJSN 1" so that the timebase counter 64 is decremented by an amount of time equal to the value stored in the timing adjust register 74.

Referring also to FIG. 24, the generic program blocks may be used, for example, to program the system timer 50 to generate waveforms that allow the communication device 12 to operate in a multi-slot communication environment. As will be understood by one having ordinary skill in the art, a multi-slot communication environment is an environment in which the communication device 12 is assigned more than one receive and/or transmit slot per frame allowing more data to be transmitted/received by the communication device 12 per frame. Thus, for example, a waveform having three receive slots 412, 414, 416, two of which 414, 416 occur sequentially, and one transmit slot 418 may be generated by loading the starting addresses of the following generic program blocks into the command register 82 at the beginning of a frame: 1) FIRST program 324; 2) RXSTART program 330; 3) RXEND program 344; 4) RXSTART program 330; 5) REPEAT program 382; 6) RXEND program 344; 7) TXSTART program 394; 8) TXEND program 372 and 9) LAST program 388.

Referring also to FIG. 25, and by way of further example, generic program blocks may also be used to program the system timer 50 to generate a waveform 420 having three receive slots 422, 424, 426, two 424, 426 of which occur sequentially, and one transmit slot 428 and further including an adjustment 430 to the timebase counter 64. Specifically, the waveform 420 may be generated by loading the starting addresses of the following generic program blocks into the command register 82 at the beginning of a frame: 1) FIRST program 324; 2) RXSTART program 330; 3) RXEND program 344; 4) RXSTART program 330; 5) REPEAT program 382; 6) RXEND program 344; 7) ADVANCE program 394; 8) TXSTART program 358; 9) TXEND program 372; 10) RETARD program 400; and 11) LAST program 388. The ADVANCE program 394 included in the command register 82 for generating the waveform 420 causes the transmit slot 428 to occur earlier and the RETARD program 400 is used to compensate for the timing adjustment caused by the ADVANCE program 394 so that the overall frame length is not altered by the timing adjustments made during the ADVANCE program 394.

Figure 26:
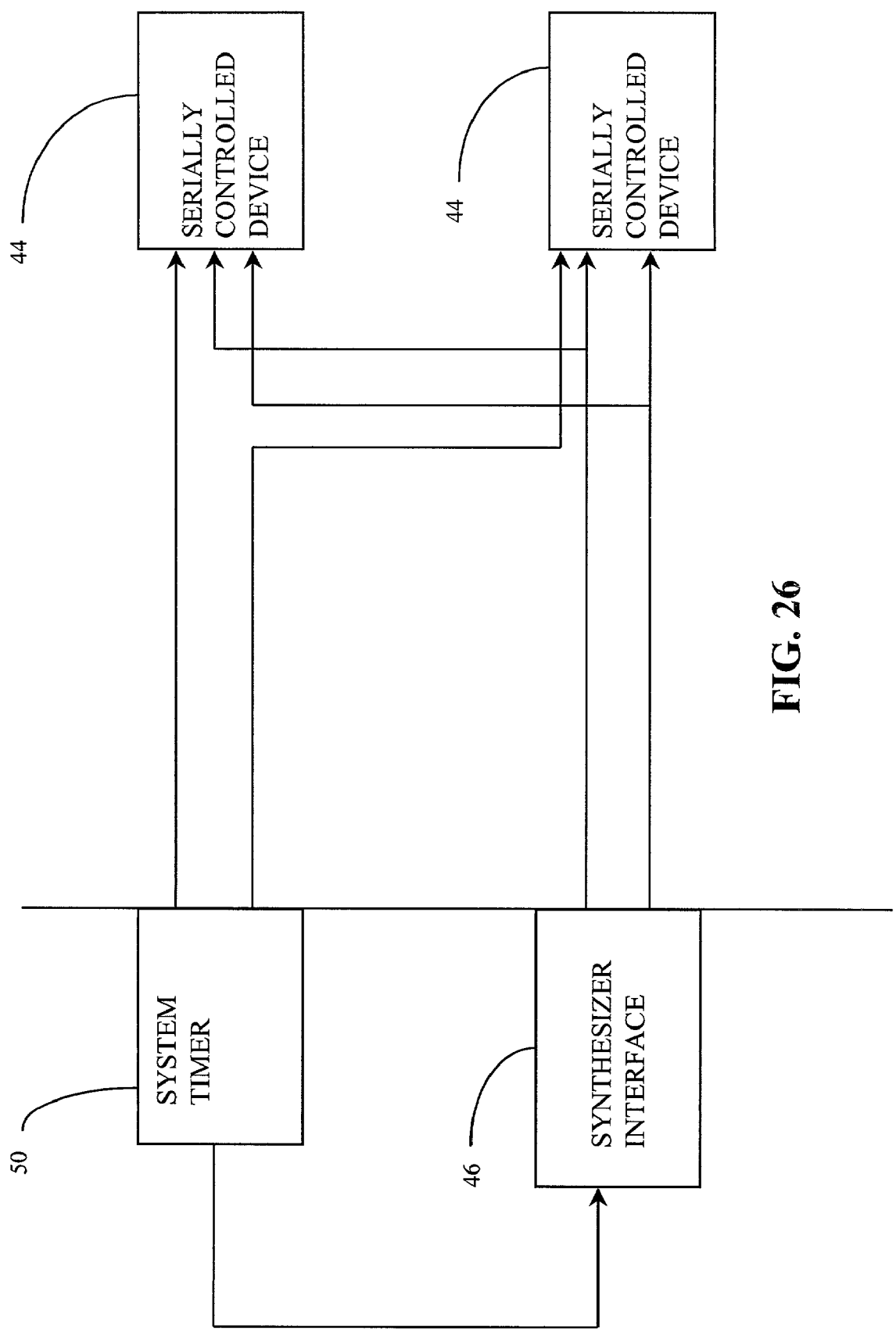

Referring now to FIG. 26, the system timer 50 may also be used, in conjunction with the synthesizer interface 46 to control multiple serial devices such as, for example, multiple frequency synthesizers 44. Specifically, the system timer 50 may control the rate at which data signals are supplied by the synthesizer interface 46 to the serial devices via SYNSEND instructions 126. As described above, the SYNSEND instruction 126 causes the sequencer 60 to supply a signal to the synthesizer interface 46 that, in turn, causes the synthesizer interface 46 to supply frequency data to the frequency synthesizer 44. The system timer 50 may further be coupled to supply signals to the serial frequency synthesizers 44 thereby enabling the serial frequency synthesizers 44 to receive the frequency data signals supplied by the synthesizer interface 46. From the foregoing description, it should be understood that a system timer for use in controlling the timing at which a mobile device communicates with a base station has been shown and described, having many desirable attributes and advantages. In particular, the system timer 50 allows the microprocessor 34 to control the sequence in which instructions are executed by the system timer 50 to thereby facilitate communication using multiple signal formats. Specifically, the system timer includes a command register 82 that may be used in conjunction with a JCMD instruction 112 that, when executed by a sequencer 60 disposed in the system timer 50, causes the sequencer to conditionally jump to the instruction located at an address stored in the command register 82 or to instead jump to an address specified in the JCMD instruction, depending on whether the command register 82 is empty.

In addition, the system timer 50 includes a timebase counter 64, a time base counter length register 68, a timebase adjust register 70 and a timing adjust register 74 that allow the system timer 50 to update the timing of the communication device 12 once each frame to compensate for signals that are delayed or that arrive earlier than anticipated due to movement of the communication device 12 relative to the base station 10.

While various embodiments of the present invention have been shown and described, it should be understood that other modifications, substitutions and alternatives are apparent to one of ordinary skill in the art. For example, although much of the detailed description describes the microprocessor as controlling the order in which the instructions disposed in the system timer memory are executed, the DSP may instead control the order in which the system timer software instructions are executed in much the same manner as the microprocessor. Specifically, and as will be known by one having ordinary skill in the art, many conventional system timers are configured such that the DSP performs the functions described herein as being performed by the microprocessor. Thus, one having ordinary skill in the art will understand that the DSP may be programmed to perform most if not all of the functions described as being performed by the microprocessor.

In addition, the set of software instructions described herein as being used to program the sequencer disposed in the system timer are intended to be exemplary only. More particularly, any set of software instructions defined to perform similar functions will provide the system timer with the enhanced flexibility described. Moreover, although the timing of the timebase counter is described as being performed using the timing adjust register and the timebase adjust register, any number of registers configured in a variety of manners may be used to achieve the timing adjustment features described herein.

Further, although the system timer is described as being used in a communication device such as a wireless telephone, the system timer may instead be used in any type of wireless communication device including, for example, a pager, a personal digital assistant having communication capabilities or any other type of device having communication capabilities. Specifically, the output pins of the system timer may be adapted to control any type of communication device to thereby allow any type of communication device to synchronize with any other type of communication device.

Such modifications, substitutions and alternatives can be made without departing from the spirit and scope of the invention, which should be determined from the appended claims.

What is claimed is:

1. A system timer for controlling the timing at which a communication device communicates, said system timer comprising:
a memory device adapted to store a set of software instructions;
a processor coupled to said memory device, said processor being adapted to execute any of said software instructions in any of a plurality of sequences, each of said sequences causing said processor to generate a corresponding set of control signals, each of said corresponding set of control signals being adapted to enable communication by said communication device in one of a multiplicity of communication formats, wherein each of said communication formats devices the timing at which a set of data is communicated by said communication device;
wherein said processor comprises a first processor and further wherein said communication device comprises a second processor, wherein said plurality of sequences in which said first processor executes said software instructions is controlled by said second processor.

2. The system timer of claim 1 wherein said system timer further comprises a memory register for storing addresses, said addresses indicating a set of locations at which at least some of said software instructions are stored in said memory device, wherein said first processor is adapted to extract said addresses from said memory register and to execute said software instructions located at said addresses thereby causing said first processor to execute said software instructions in a sequence defined by an order in which said addresses are stored in said memory register.

3. The system timer of claim 2 wherein said second processor controls said plurality of sequences in which said first processor executes said software instructions by controlling said order in which said addresses are stored in said memory register.

4. The system timer of claim 3 wherein said software instructions comprise a first software instruction that, when executed by said first processor, causes said first processor to extract one of said addresses stored in said memory register and to execute a second software instruction located at said one of said addresses provided that said second processor has caused at least one of said addresses to be stored in said memory register.

5. The system timer of claim 4 wherein said first software instruction further causes said first processor to execute a third software instruction stored in said memory device provided that said second processor has not stored said at least one address in said memory register, wherein an address at which said third software instruction is stored in said memory device is specified in said first software instruction.

6. The system timer of claim 1 wherein said set of software instructions stored in said memory device comprises a first instruction, said first instruction, when executed by said first processor, causing said first processor to execute a first sequence of software instructions provided that a condition has been satisfied by said second processor and further causing said first processor to execute a second sequence of software instructions provided that said condition has not been satisfied.

7. The system timer of claim 6 wherein said first sequence of software instructions begins with a second instruction located at an address specified in said first instruction.

8. The system timer of claim 6 wherein said condition comprises a mode bit being set to a first logic level.

9. The system timer of claim 6 wherein said condition comprises an equation being equal to a predefined value.

10. The system timer of claim 9 wherein said equation being equal to said predefined value depends upon whether a set of mode bits have been set by said second processor.

11. The system timer of claim 1 wherein said plurality of sequences comprises a first sequence that causes said communication device to perform single slot communication and wherein said second processor is adapted to modify said first sequence to a second sequence that causes said communication device to perform multi-slot communication.

12. The system timer of claim 1 wherein said second processor controls said sequence by setting a control bit stored in a memory register.

13. The system timer of claim 1 wherein said second processor comprises a digital signal processor.

14. The system timer of claim 1 wherein said second processor comprises a microprocessor.

15. The system time of claim 1 wherein said plurality of sequences comprises a first sequence of said software instructions that, when executed by said first processor, enables operation of said communication device in a first mode, wherein said plurality of sequences further comprises a second sequence of said software instructions that, when executed by said first processor, enables operation of said communication device in a second mode, and wherein said second processor is adapted to cause said first processor to switch between executing said first and second sequences thereby causing said communication device to switch between said first and second modes.

16. The system timer of claim 15 wherein said first mode comprises a stand by mode and wherein said second mode comprises an acquisition mode.

17. The system timer of claim 15 wherein said first mode comprises an acquisition mode and wherein said second mode comprises a steady state mode.

18. The system timer of claim 1 wherein said multiplicity of communication formats comprises a single slot communication format.

19. The system time of claim 1 wherein said multiplicity of communication formats comprises a multi-slot communication format.

20. A method for controlling the timing at which a communication device communicates, said communication device comprising a first processor and a system timer, said system timer comprising a second processor and a memory device adapted to store a set of software instructions, said method comprising the steps of:
causing said second processor to execute a set of software instructions in any of a plurality of sequences, each of said sequences causing said second processor to generate a corresponding set of control signals, each of said corresponding set of control signals being adapted to enable communication by said communication device in one of a multiplicity of communication formats, wherein each of said communication formats defines the timing at which a set of data is communicated by said communication device; and, causing said first processor to define said sequences in which said second processor executes said software instructions.

21. The method of claim 20 wherein a first of said sequences causes said communication device to communicate in a first timing format and wherein a second of said sequences causes said communication device to communicate in a second timing format.

22. The method of claim 20 wherein said first timing format comprises a single slot timing format and wherein said second timing format comprises a multi-slot timing format.

23. The method of claim 20 wherein a first of said sequences defined by said first processor causes said communication device to operate in a first mode and wherein a second of said sequences defined by said first processor causes said communication device to communicate in a second mode.

24. The method of claim 22 wherein said first mode comprises a stand by mode and wherein said second mode comprises an acquisition mode.

25. The method of claim 23 wherein said first mode comprises an acquisition mode and wherein said second mode comprises a steady state mode.

* * * * *